(12) United States Patent
Holmes et al.

(10) Patent No.: US 12,404,091 B2
(45) Date of Patent: Sep. 2, 2025

(54) BULK MATERIAL RECEIVING, CONVEYING, STORING, AND DISPENSING

(71) Applicant: Owens-Brockway Glass Container Inc., Perrysburg, OH (US)

(72) Inventors: Kirk Holmes, Perrysburg, OH (US); Steven Will, Sylvania, OH (US); Manfred Robert Romstöck, Freudenberg (DE); Guenther Josef Mlynar, Wertheim-Bettingen (DE)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 850 days.

(21) Appl. No.: 17/492,547

(22) Filed: Oct. 1, 2021

(65) Prior Publication Data
US 2022/0106104 A1    Apr. 7, 2022

Related U.S. Application Data

(63) Continuation-in-part of application No. 17/061,302, filed on Oct. 1, 2020, now Pat. No. 11,912,608.

(51) Int. Cl.
| | |
|---|---|
| B65D 88/02 | (2006.01) |
| B65D 88/32 | (2006.01) |
| B65D 88/54 | (2006.01) |
| B65G 53/36 | (2006.01) |
| B65G 53/44 | (2006.01) |
| C03B 1/02 | (2006.01) |
| C03C 1/02 | (2006.01) |

(52) U.S. Cl.
CPC .......... *B65D 88/027* (2013.01); *B65G 53/36* (2013.01); *B65G 53/44* (2013.01); *B65D 88/32* (2013.01); *B65D 88/54* (2013.01); *C03B 1/02* (2013.01); *C03C 1/026* (2013.01)

(58) Field of Classification Search
CPC ..... B65G 53/40; B65G 53/48; B65D 51/1616
See application file for complete search history.

(56) References Cited

U.S. PATENT DOCUMENTS

| | | | | |
|---|---|---|---|---|
| 2,754,996 A | * | 7/1956 | Heltzel | B65B 1/34 222/413 |
| 3,707,998 A | * | 1/1973 | Dalrymple | B65G 69/186 55/467 |

(Continued)

FOREIGN PATENT DOCUMENTS

| | | | | |
|---|---|---|---|---|
| CN | 114560302 A | * | 5/2022 | |
| EP | 1588963 B1 | * | 9/2009 | B65G 53/52 |

(Continued)

OTHER PUBLICATIONS

PCT Invitation to Pay Additional Fees,PCT Int.Serial No. PCT/US2021/053246, Int. Filing Date: Oct. 1, 2021, Applicant: Owens-Brockway Glass Container Inc. Date:May 19, 2022.

*Primary Examiner* — Timothy L Maust

(57) ABSTRACT

A bulk material handling system includes a majors material handling system including bulk material storage modules and bulk material dispensing modules. The dispensing modules include bulk material dosing assemblies and docking assemblies. A bulk material handling method includes conveying bulk material from a mobile bulk material container into a stationary bulk material container at a glass manufacturing facility via dense phase pneumatic conveying.

38 Claims, 31 Drawing Sheets

(56) References Cited

U.S. PATENT DOCUMENTS

| | | | | |
|---|---|---|---|---|
| 4,074,507 A | * | 2/1978 | Ruf | B65B 55/24 |
| | | | | 53/502 |
| 4,125,195 A | * | 11/1978 | Sasadi | B65G 11/126 |
| | | | | 414/373 |
| 4,545,411 A | * | 10/1985 | Wierzba | F23J 7/00 |
| | | | | 122/390 |
| 4,742,938 A | * | 5/1988 | Niewold | B65G 21/12 |
| | | | | 222/536 |
| 5,670,751 A | * | 9/1997 | Hafner | G01G 11/08 |
| | | | | 177/60 |
| 6,269,852 B1 | | 8/2001 | Muhr | |
| 6,415,909 B1 | * | 7/2002 | Mitchell | B65G 67/08 |
| | | | | 198/716 |
| 6,523,721 B1 | * | 2/2003 | Nomoto | B65G 53/44 |
| | | | | 222/129 |
| 7,384,230 B2 | | 6/2008 | Pfeiffer et al. | |
| 8,561,652 B2 | | 10/2013 | Bordere et al. | |
| 8,585,341 B1 | | 11/2013 | Oren et al. | |
| 8,864,365 B2 | | 10/2014 | Rodgers | |
| 9,126,741 B2 | | 9/2015 | Ellis et al. | |
| 9,227,780 B2 | | 1/2016 | Krohn | |
| 9,428,330 B2 | | 8/2016 | Lopez | |
| 9,688,178 B2 | | 6/2017 | Pham | |
| 9,700,175 B2 | | 7/2017 | King | |
| 9,752,389 B2 | | 9/2017 | Pham et al. | |
| 9,776,813 B2 | | 10/2017 | McMahon | |
| 9,810,363 B2 | | 11/2017 | Ganzer et al. | |
| 9,862,538 B2 | | 1/2018 | Pham et al. | |
| 9,930,837 B2 | | 4/2018 | Rowling | |
| 9,938,093 B2 | | 4/2018 | Sherwood et al. | |
| 10,059,535 B2 | | 8/2018 | Herman et al. | |
| 10,077,610 B2 | | 9/2018 | Pham et al. | |
| 10,442,614 B2 | | 10/2019 | Lucas et al. | |
| 10,526,136 B2 | | 1/2020 | Hawkins et al. | |
| 10,569,242 B2 | | 2/2020 | Stegemoeller et al. | |
| 2010/0193077 A1 | | 8/2010 | Nelson et al. | |
| 2010/0229980 A1 | | 9/2010 | Achenbach et al. | |
| 2010/0233772 A1 | | 9/2010 | Achenbach et al. | |
| 2014/0041322 A1 | | 2/2014 | Pham et al. | |
| 2014/0044508 A1 | | 2/2014 | Luharuka et al. | |
| 2015/0044003 A1 | | 2/2015 | Pham | |
| 2015/0191304 A1 | | 7/2015 | Herman et al. | |
| 2015/0360856 A1 | | 12/2015 | Oren et al. | |
| 2015/0368039 A1 | | 12/2015 | Cochrum et al. | |
| 2016/0130095 A1 | | 5/2016 | Oren et al. | |
| 2016/0244279 A1 | | 8/2016 | Oren et al. | |
| 2016/0251152 A1 | | 9/2016 | Krupa | |
| 2016/0297605 A1 | | 10/2016 | Lopez | |
| 2018/0002120 A1 | | 1/2018 | Allegretti et al. | |
| 2019/0023484 A1 | | 1/2019 | Shin | |
| 2019/0106273 A1 | | 4/2019 | Hess et al. | |
| 2019/0119038 A1 | | 4/2019 | Komelsen et al. | |
| 2019/0217258 A1 | | 7/2019 | Bishop | |
| 2019/0241356 A1 | | 8/2019 | Schaffner et al. | |
| 2019/0256281 A1 | | 8/2019 | Cochrum et al. | |
| 2019/0276225 A1 | | 9/2019 | Warren et al. | |
| 2020/0262641 A1 | | 8/2020 | Friesen | |

FOREIGN PATENT DOCUMENTS

| | | |
|---|---|---|
| GB | 2430451 A | 3/2007 |
| WO | WO201972992 A1 | 4/2019 |

* cited by examiner

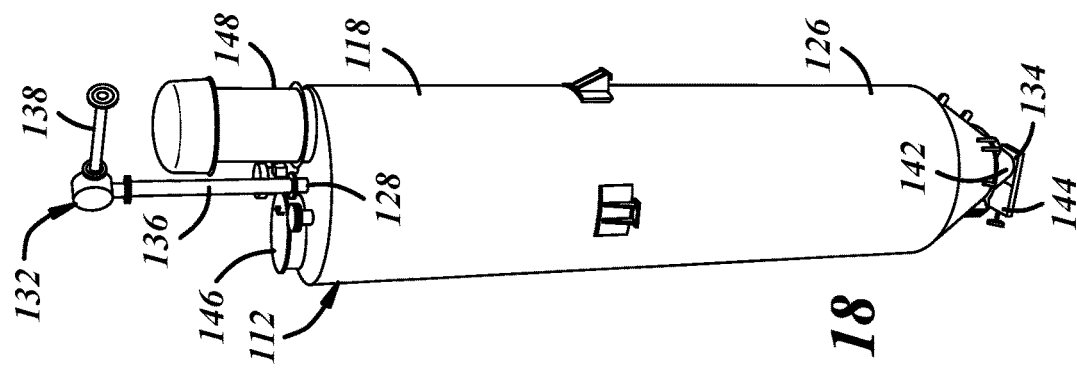
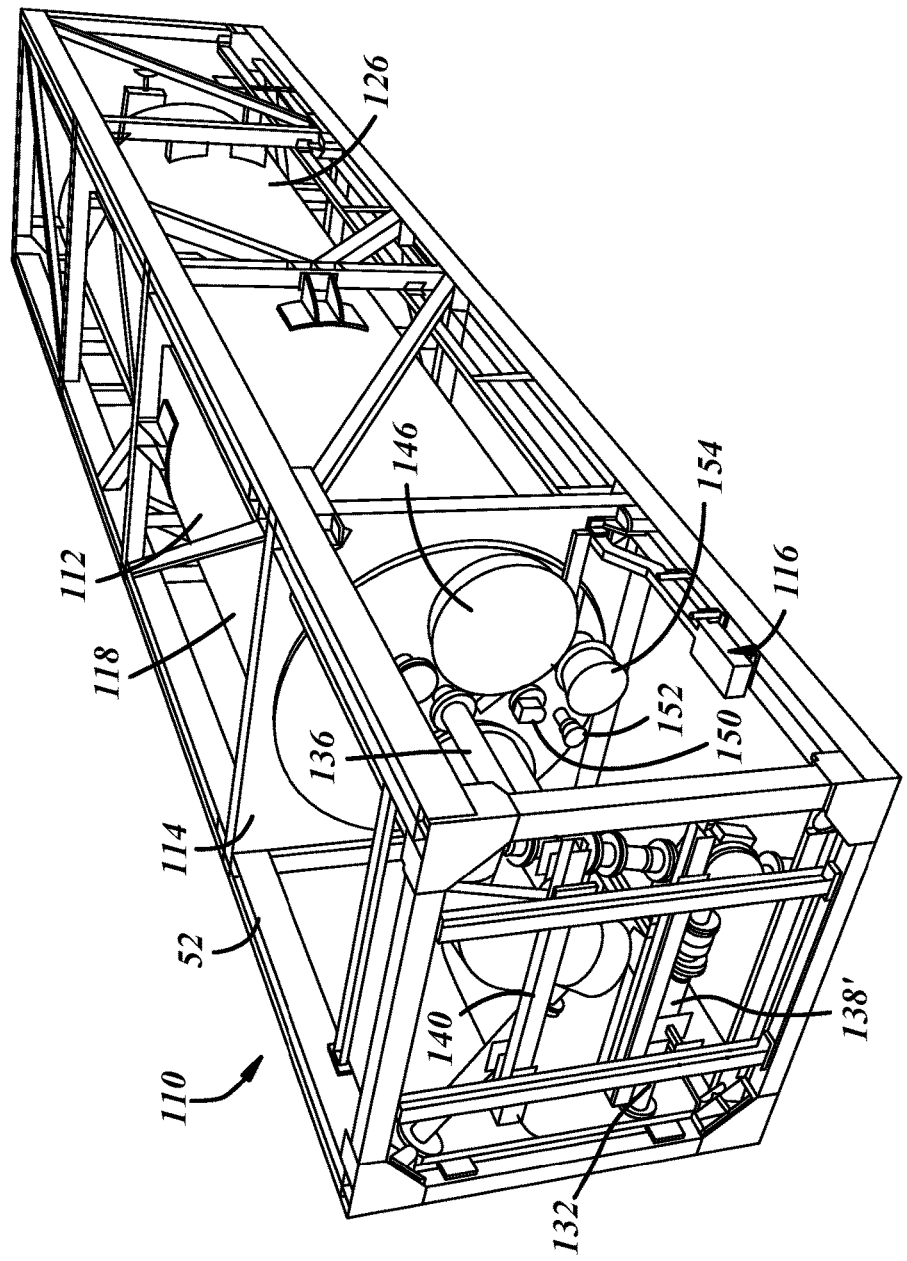
FIG. 18
FIG. 17

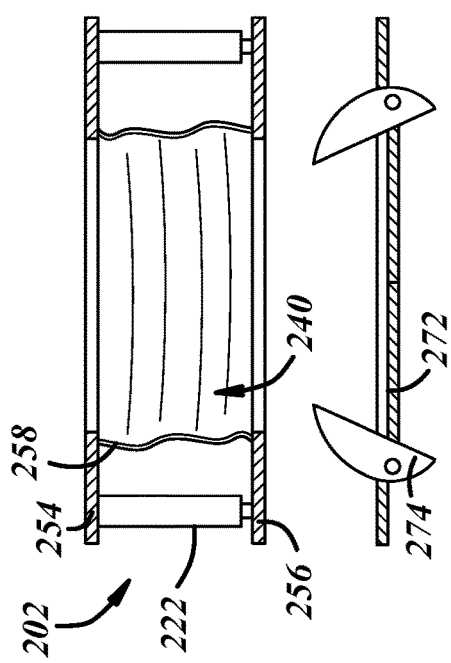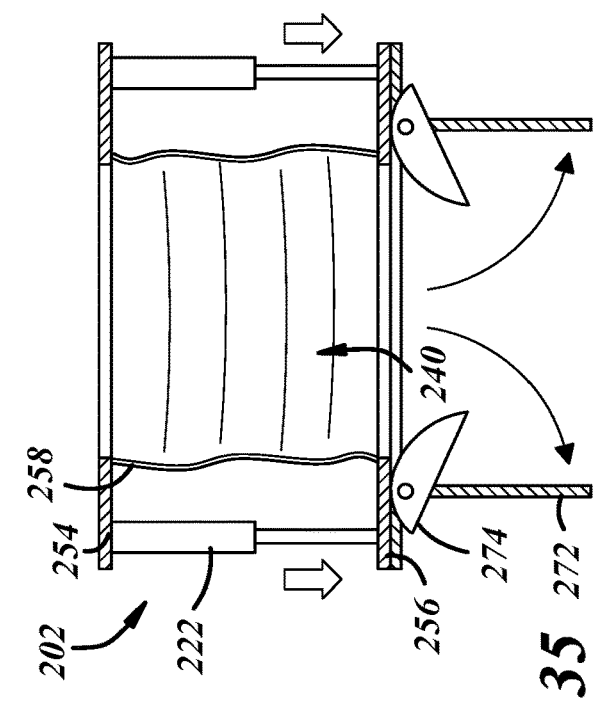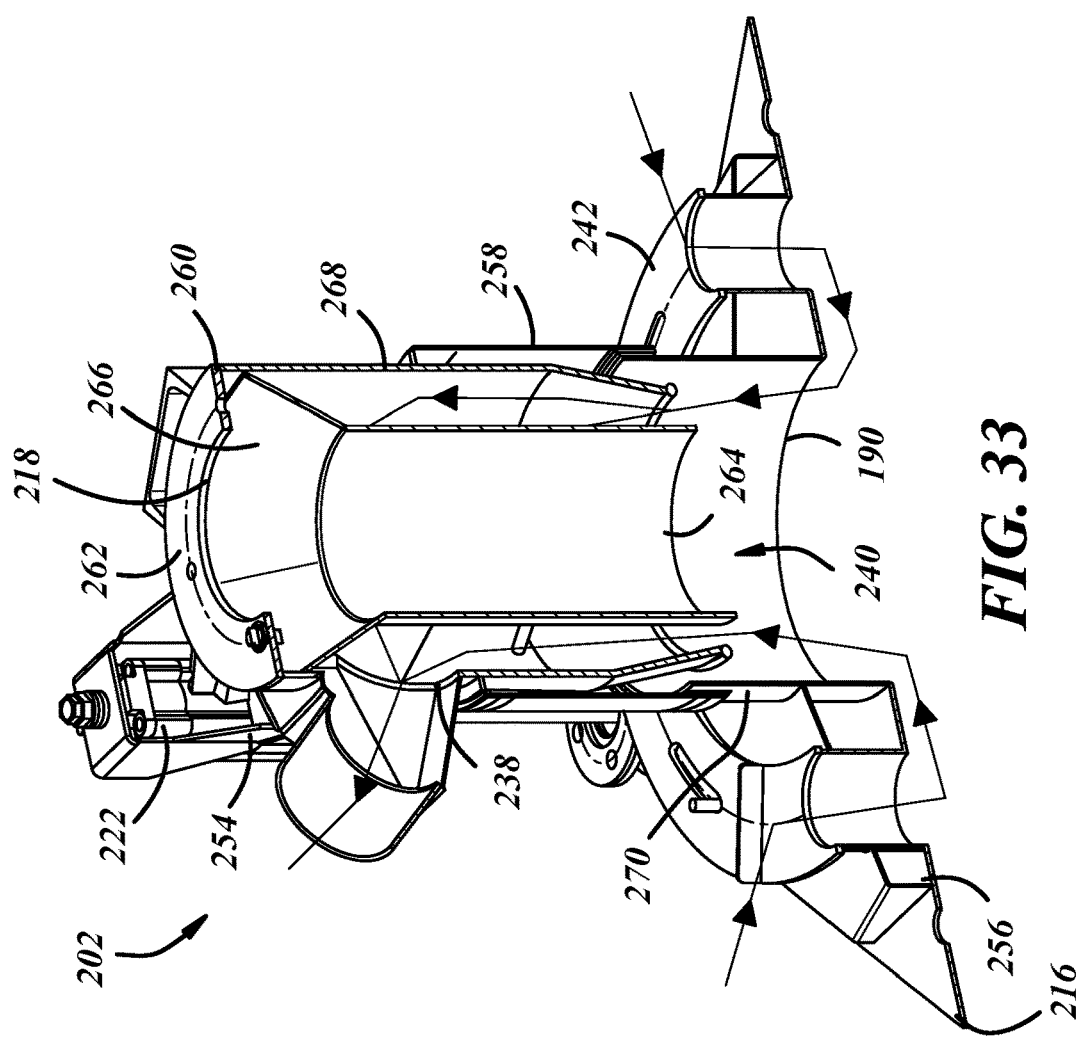

BULK MATERIAL RECEIVING, CONVEYING, STORING, AND DISPENSING

TECHNICAL FIELD

This patent application discloses innovations to material handling and, more particularly, to bulk material handling including receiving, conveying, storing, and dispensing of bulk materials.

BACKGROUND

A conventional glass "batch house" includes a custom architectural installation specifically designed for glass manufacturing, and a glass batch handling system supported and sheltered by the architectural installation. The batch house is generally configured to receive and store glass feedstock, or "glass batch" materials, including glassmaking raw materials, for example, sand, soda ash, and limestone, and also including cullet in the form of recycled, scrap, or waste glass. The conventional glass batch house requires a specialized, dedicated, and permanent architectural installation including a tall building and a covered receiving platform and pit to receive glass batch from underneath railcars or trucks that arrive loaded with glass batch materials. The batch house also includes multi-story silos to store the glass batch, and glass batch elevators and conveyors to move the glass batch from receiving systems at a bottom of the pit to tops of the silos. The batch house further includes cullet pads at ground level to receive and store cullet, crushers to crush cullet to a size suitable for melting, and cullet elevators and conveyors to move crushed cullet to one of the silos in the batch house. The batch house additionally includes a mixer to mix the glass batch received from the silos, conveyors integrated with scales to weigh and deliver each glass batch material from the silos to the mixer, mixer conveyors to move the glass batch from the mixers to the hot-end subsystem, and dust collectors to collect dust from the various equipment. The installation occupies a large footprint and a large volumetric envelope, takes about one to two years to construct, cannot be relocated from one location to another, and tends to be a dusty and dirty environment.

SUMMARY OF THE DISCLOSURE

The present disclosure embodies a number of aspects that can be implemented separately from or in combination with each other.

Embodiments of a bulk material storage module include a container module frame, a bulk material container supported within the frame, the bulk material container having: an upper portion and a lower portion, an inlet located along the upper portion for receiving bulk material into the material container, an outlet located along the lower portion for discharging bulk material from the material container, and a vent to permit air exchange between an inside of the container and outside the container during receiving and/or discharging of bulk material from the material container. The module further includes at least one utilities receiver configured to couple the module with at least one of: a control system, an electric utility, a pneumatic utility, or another bulk material storage module. The module is configured to be attached side-by-side with up to four other bulk material storage modules and corner-to-corner with up to four other bulk material storage modules, all of the modules having identical frames and bulk material containers.

Embodiments of a bulk material dispensing module include: a dispensing module frame having a longitudinal axis, the frame further comprising a plurality of transverse frame members spaced along the longitudinal axis, wherein a dispensing cell is defined between each pair of transverse frame members; at least one bulk material dispenser supported within the frame, each bulk material dispenser being supported in a different dispensing cell and comprising: an inlet accessible through a first side of the frame and configured to be coupled with and receive material from a bulk material container, an outlet accessible through an opposite side of the frame and configured to be coupled with and discharge material to a transport bin, and a conveyor configured to move bulk material from the inlet to the outlet when the inlet is coupled with the bulk material container. The module further includes a controller carried by the frame for each bulk material dispenser. The module is configured to be attached side-by-side with one or more other bulk material dispensing modules, each of the modules having identical frames, dispenser inlets, and dispenser outlets, and the storage module has external dimensions less than or equal to an intermodal freight container.

Embodiments of a bulk material handling method include conveying bulk material directly from a mobile bulk material container into a stationary bulk material container at a glass manufacturing facility via dense phase pneumatic conveying.

Embodiments of a bulk material dispenser include a dispenser inlet configured for coupling with and receiving bulk material from an outlet of a bulk material container, a dispenser outlet configured for coupling with and discharging the bulk material into a transport bin, a conveyor that moves bulk material received at the inlet side toward the outlet, and a filter assembly configured to filter solids from air displaced from the transport bin during dispenser operation.

Embodiments of a docking assembly for use in a bulk material dispensing system include an inlet configured for coupling with and receiving bulk material from a bulk material dosing assembly, and an outlet configured for coupling with and discharging the bulk material into a transport bin. The outlet is moveable toward and away from the inlet and, thereby, respectively away from and toward the transport bin.

Embodiments of a bulk material handling method include: coupling an outlet of a bulk material dispenser with a transport bin to form a closure at an inlet of the transport bin and place an inside of the transport bin in communication with the dispenser; receiving bulk material in the dispenser from a bulk material container; forming a reduced pressure region in an internal volume of the dispenser; and dispensing the bulk material from the dispenser and into the transport bin through the reduced pressure region.

BRIEF DESCRIPTION OF THE DRAWINGS

FIG. 17 is a perspective view of a bulk material storage module of the system of FIG. 13 in a shipping orientation as viewed from a top end of the module.

FIG. 18 is a perspective elevation view of a bulk material storage container of the module of FIG. 17.

FIG. 33 is an isometric cross-sectional view of a docking assembly of the bulk material dispenser of FIGS. 26-28.

FIG. 34 is a schematic cross-sectional view of a portion of a docking assembly in a retracted condition over a transport bin.

FIG. 35 is a schematic cross-sectional view of a portion of a docking assembly in an extended condition and coupled with a transport bin.

DETAILED DESCRIPTION

Figure 1A:
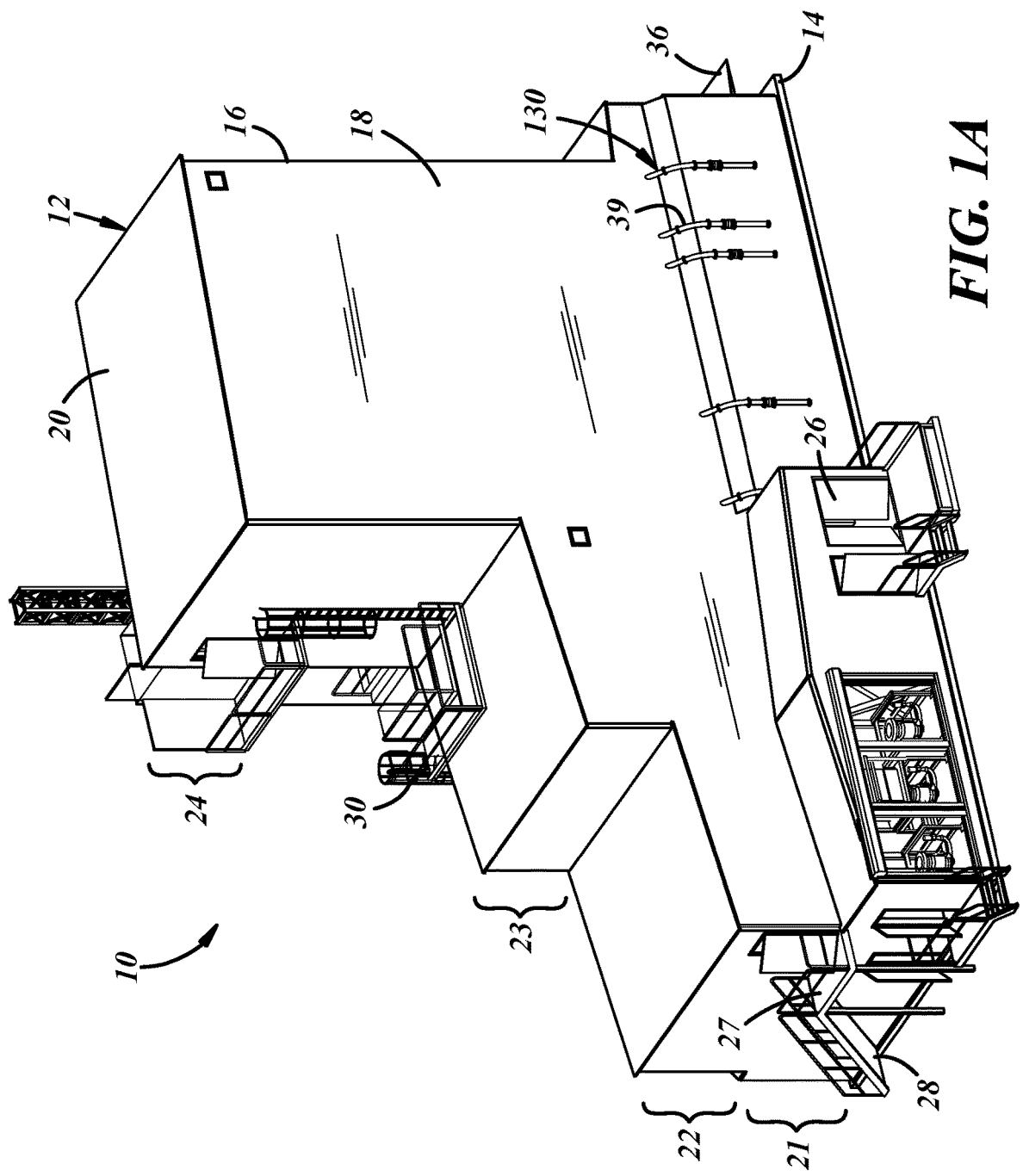
FIG. 1A is a perspective view of a bulk material handling system in accordance with an illustrative embodiment of the present disclosure, illustrating a building having a roof, cladding, elevator, stairs, ladders, and platforms.
Figure 1B:
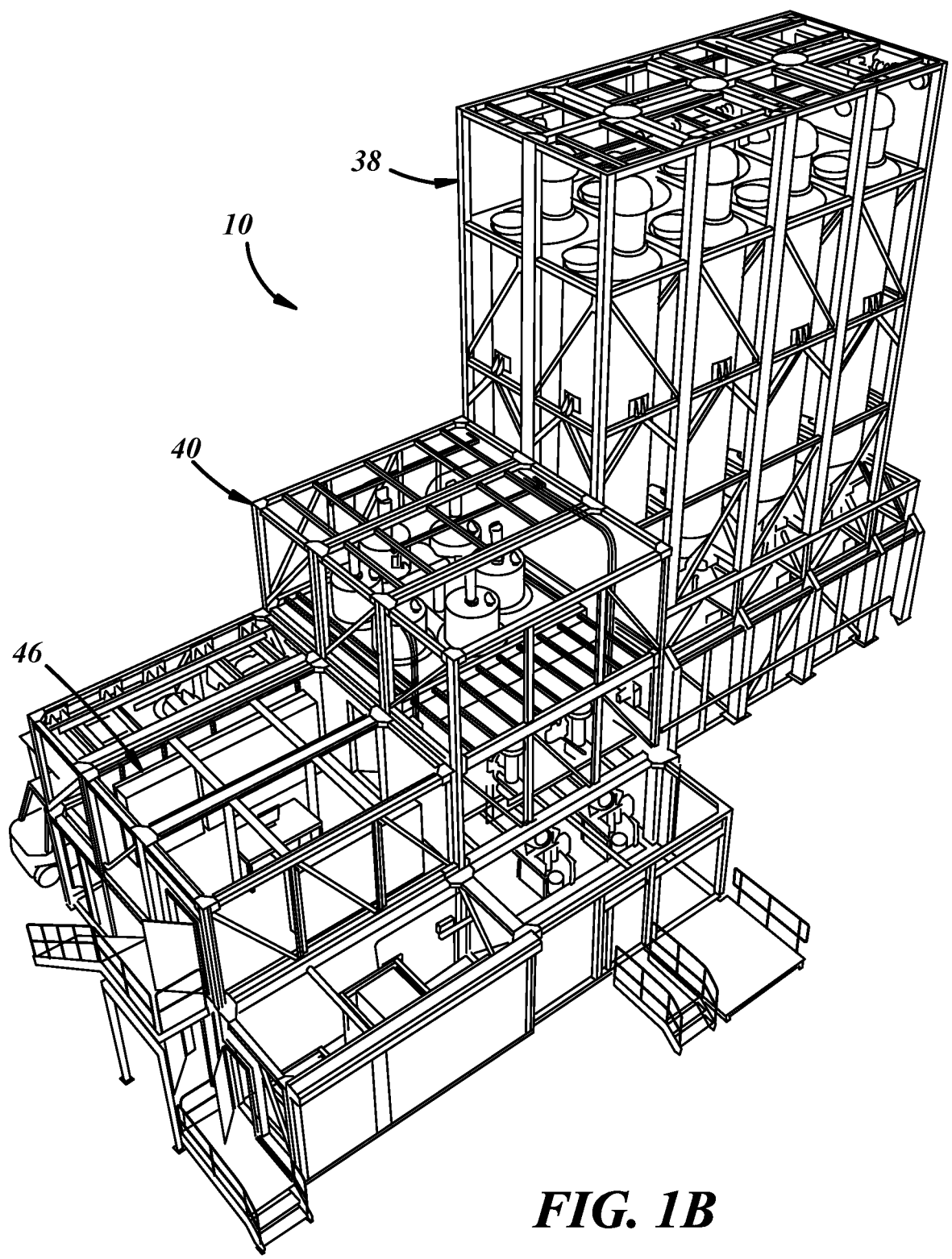
FIG. 1B is another perspective view of the system corresponding to FIG. 1A, without the roof, cladding, elevator, and ladders.

In general, a new bulk material handling system is illustrated and described with reference to a glass feedstock handling system for a glass container factory as an example. Those of ordinary skill in the art would recognize that other glass factories, for example, for producing glass fibers, glass display screens, architectural glass, vehicle glass, or any other glass products, share many aspects with a glass container factory. Accordingly, the presently disclosed and claimed subject matter is not necessarily limited to glass containers, glass container feedstock handling systems, and glass container factories and, instead, encompasses any glass products, glass product feedstock handling systems, and glass product factories. Moreover, the presently disclosed and claimed subject matter is not necessarily limited to bulk material handling for the glass industry and, instead, encompasses any products, bulk material handling systems, and factories in any industry in which bulk material handling is useful.

Although conventional glass batch houses and methods enable efficient production of high-quality products for large-scale production runs, the presently disclosed subject matter facilitates implementation of a revolutionary bulk material handling system that is simpler than a conventional batch house, is modular and mobile, and is more compact and economical at least for smaller scale production runs or incremental additions to existing large-scale production runs. More specifically, in accordance with an aspect of the present disclosure, a new bulk material handling system may include prefabricated modular equipment configurations to facilitate rapid and mobile production capacity expansion in smaller increments and at lower capital cost than conventional glass batch houses, and also may include techniques for handling bulk material in a dust-free or reduced dust manner. Further, the new system may omit one or more conventional glass batch house subsystems or aspects thereof, as described in further detail below.

With specific reference now to FIGS. 1A through 8, a new bulk material handling system 10 includes a new architectural installation 12 and new subsystems and equipment supported and sheltered by the installation 12. The installation 12 includes a concrete foundation 14 having a floor which may include, for example, a four to six-inch-thick slab, and a bulk material handling building 16 on the foundation including walls 18 and a roof 20. The installation 12 requires no basement and no pit below the floor, such that the concrete foundation has earthen material directly underneath, wherein the foundation slab establishes the floor. As used herein, the term "pit" includes an elevator pit, conveyor pit, loading pit, and the like, located below grade or below ground level and that may require excavation of earthen material. As used herein, the term "basement" includes the lowest habitable level of the bulk material handling building below a floor of the building and can include a first level or a below grade or below ground level portion that may require excavation of earthen material.

The installation 12 also includes multiple habitable levels, including a base or first level 21, an intermediate or second level 22, an upper or third level 23, and an attic or fourth level 24. Also, as used herein, the term "habitable" means that there is standing room for an adult human in the particular space involved and there is some means of ingress/egress to/from the space while walking such as a doorway, stairway, and/or the like. The installation 12 further includes egress doors 26, egress platforms 27, stairs 28, ladders 30, and an elevator 32 to facilitate access to the egress platforms 27 and doors 26. The installation 12 additionally includes loading doors 34, loading platforms, and one or more ramps. Notably, the building 16 is constructed of many modules, including modular walls used to construct a base frame for the first level, and modular frames for the second, third, and fourth levels, as will be discussed in detail below.

With continued reference to FIGS. 1A through 8, the bulk material handling system 10 includes several subsystems that occupy a volumetric envelope much smaller than conventional batch houses such that the system 10 likewise requires a smaller volumetric envelope than conventional glass batch houses. The bulk material handling system 10 may be a glass bulk material handling system configured to receive and store glass feedstock or "glass batch." The glass batch includes glassmaking raw materials, including glass feedstock "majors" and "minors" and also may include cullet in the form of recycled, scrap, or waste glass. The bulk material handling system receives glass batch bulk materials and combines them into doses and provides the doses to a downstream hot-end system of a glass factory adjacent to or part of the bulk material handling system.

The bulk material handling system 10 includes one or more of the following subsystems. A first bulk material, or majors, subsystem 38 is configured to receive, pneumatically convey, store, and gravity dispense majors bulk material. Glassmaking majors may include sand, soda, limestone, alumina, saltcake, and, in some cases, dust recovery material. Similarly, a second bulk material, or minors, subsystem 40 is configured to receive, pneumatically convey, and store minors bulk material from individual bulk material bags. Glassmaking minors may include selenium, cobalt oxide, and any other colorants, decolorants, fining agents, and/or other minors materials suitable for glassmaking. A bulk material discharging subsystem 54 is configured to receive bulk material from the majors and minors subsystems 38, 40 and transmit the bulk material to downstream bulk material processing equipment, for example, a glass melting furnace separate from and downstream of the bulk material handling system 10. A bulk material transfer or transport subsystem 44 is configured to receive bulk material from the majors and minors subsystems 38, 40, and transport the bulk material within, to, and from, the majors and minors subsystems 38, 40, and to and from the discharge subsystem 42. A controls subsystem 46 is in communication with various equipment of one or more of the other subsystems 38, 40, 42, 44, and is configured to control various aspects of the system 10. Those of ordinary skill in the art would recognize that the system 10 can be supplied with utility or plant electrical power, and can include computers, sensors, actuators, electrical wiring, and the like to power and communicate different parts of the system 10 together. Likewise, the system 10 can be supplied with plant or compressor pneumatic power/pressure, and can include valves, lubricators, regulators, conduit, and other like pneumatic components to pressurize and communicate different parts of the system 10 together.

The system 10 may be pneumatically closed from pneumatic input or receiving conduit 39 of the majors subsystem 38 to pneumatic output or transmitting conduit 43 of the discharging subsystem 54. The pneumatic receiving conduit 39 may extend through one or more walls of the building for accessibility to bulk transporters, e.g., trucks or rail cars, that bring bulk materials and that may have pressurized vessels to assist with pneumatic receiving and conveying of bulk material. The receiving conduit 39 has any suitable couplings for coupling to bulk transporters in a pneumatically sealed manner, wherein the bulk transporters may have pumps, valves, and/or other equipment suitable to pressurize the receiving conduit to push bulk material into the majors subsystem 38 and/or the batch handling system 10 itself may include pumps, valves, pressurized plant air plumbing, and/or other equipment suitable to apply positive and/or negative (vacuum) pressure to the input conduit to push and/or pull bulk material into the majors and minors subsystems 38, 40.

The transmitting conduit 43 may extend through one or more walls or the roof of the building for transmission to downstream bulk material processing equipment, for instance, in a hot end subsystem of a glass manufacturing system (not shown). For example, the transmitting conduit 43 is pneumatically sealingly coupled to a receiver hopper at a glass melter in the hot end subsystem. The conduit 43 may have any suitable couplings for coupling to the receiver hopper in a pneumatically sealed manner. Those of ordinary skill in the art would recognize that the bulk material handling system is pneumatically closed between the pneumatic receiving conduit and the pneumatic transmitting conduit. This is in contrast to conventional systems where bulk material is open to the surrounding environment. The phrase "pneumatically closed" means that the path, and the bulk materials following that path, from receiving conduit to transmitting conduit is/are enclosed, and not openly exposed to the surrounding environment, although not necessarily always sealed air-tight.

Figure 2A:
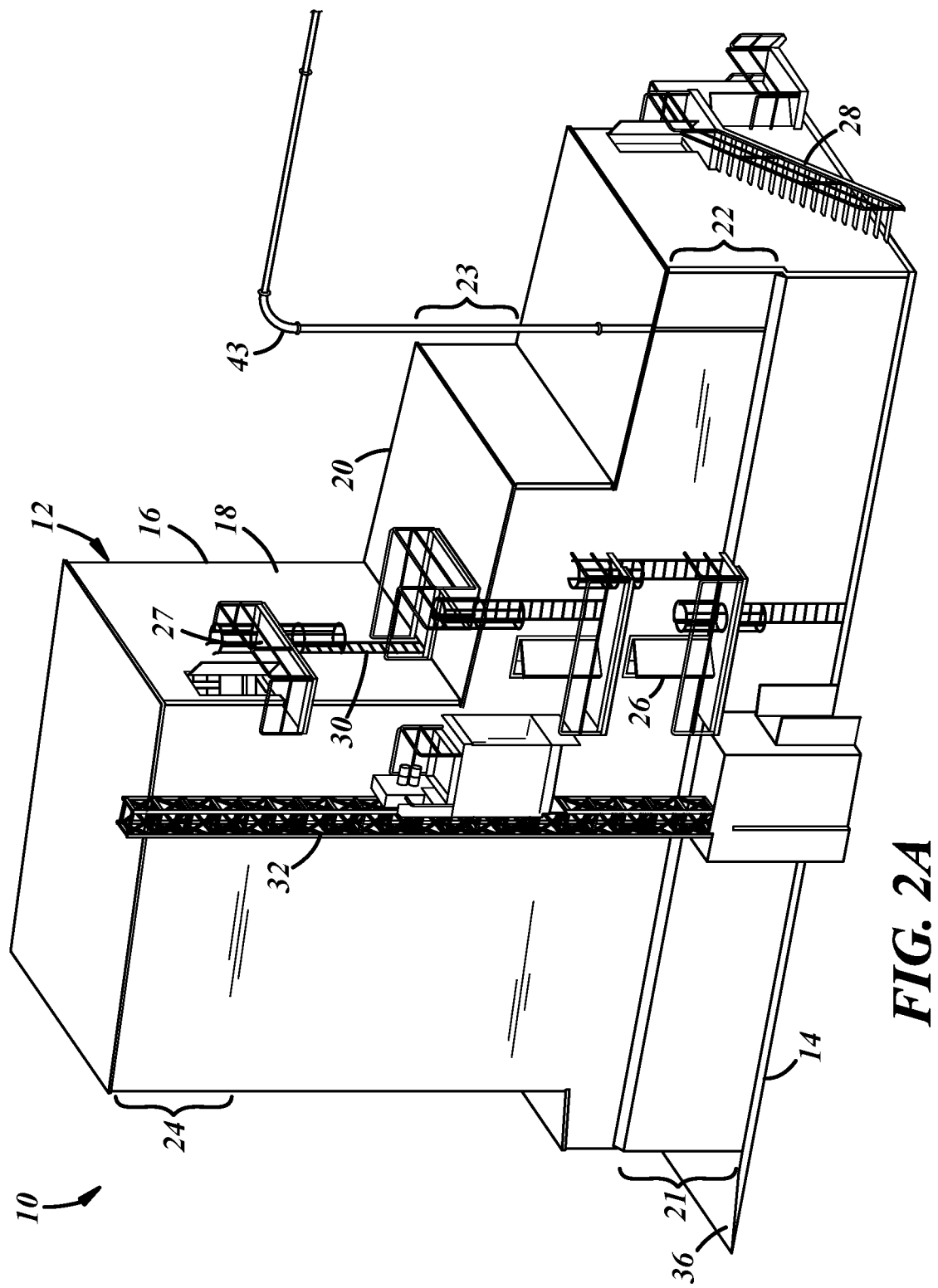
FIG. 2A is a different perspective view of the system of FIG. 1A, illustrating the building with the roof, cladding, elevator, stairs, ladders, and platforms.
Figure 2B:
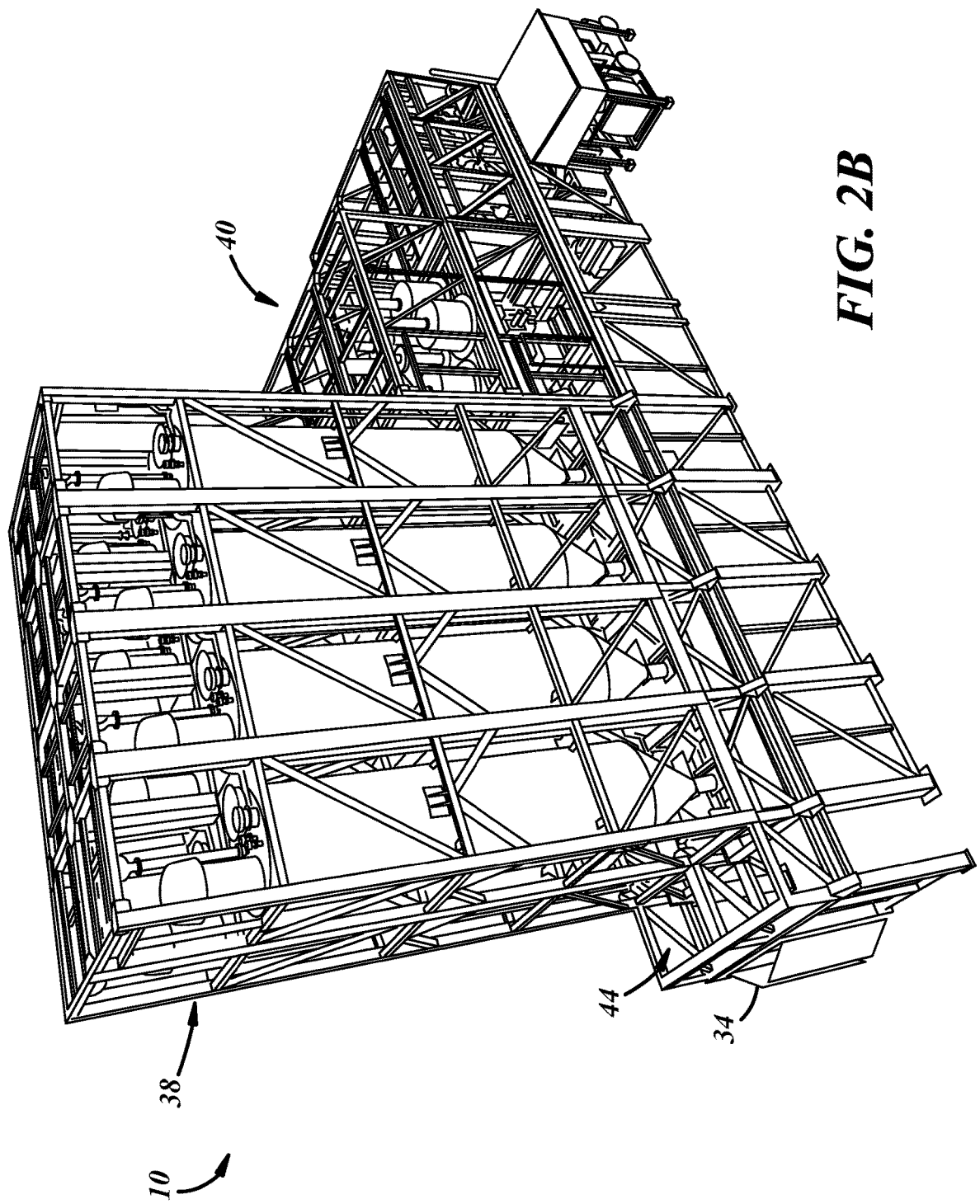
FIG. 2B is another perspective view of the system corresponding to FIG. 2A, without the roof, cladding, elevator, and ladders.
Figure 3:
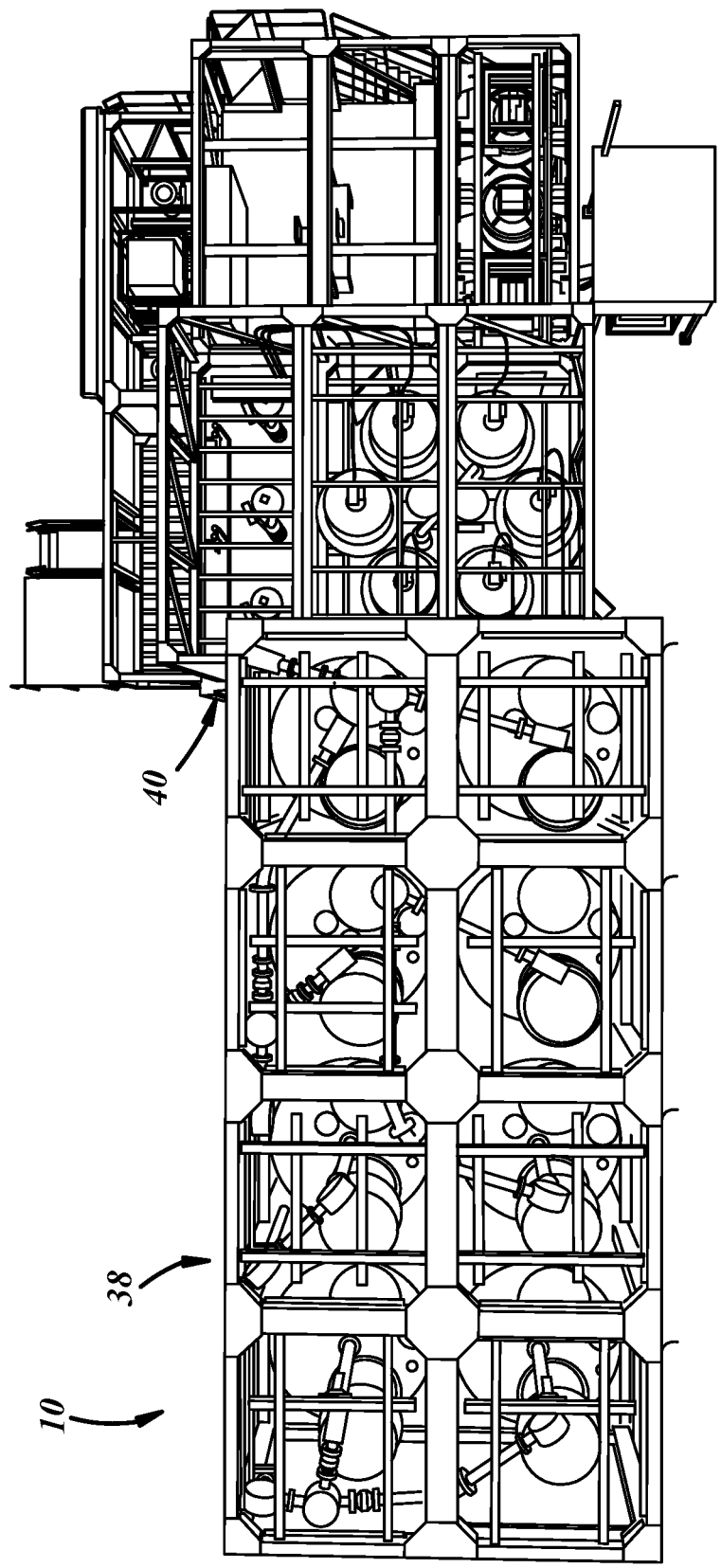
FIG. 3 is a top view of the system of FIG. 1A.
Figure 4:
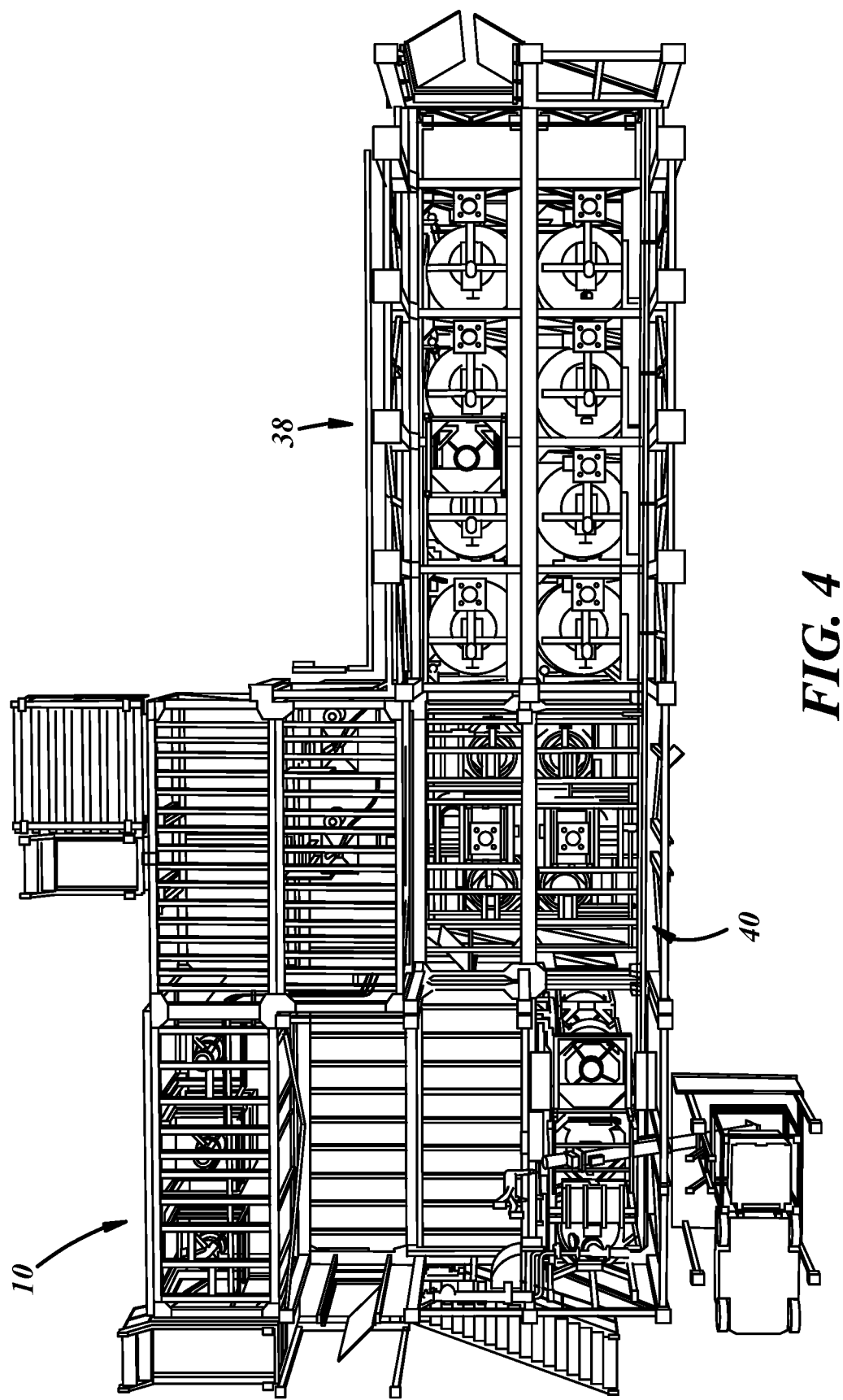
FIG. 4 is a bottom view of the system of FIG. 1A.
Figure 5:
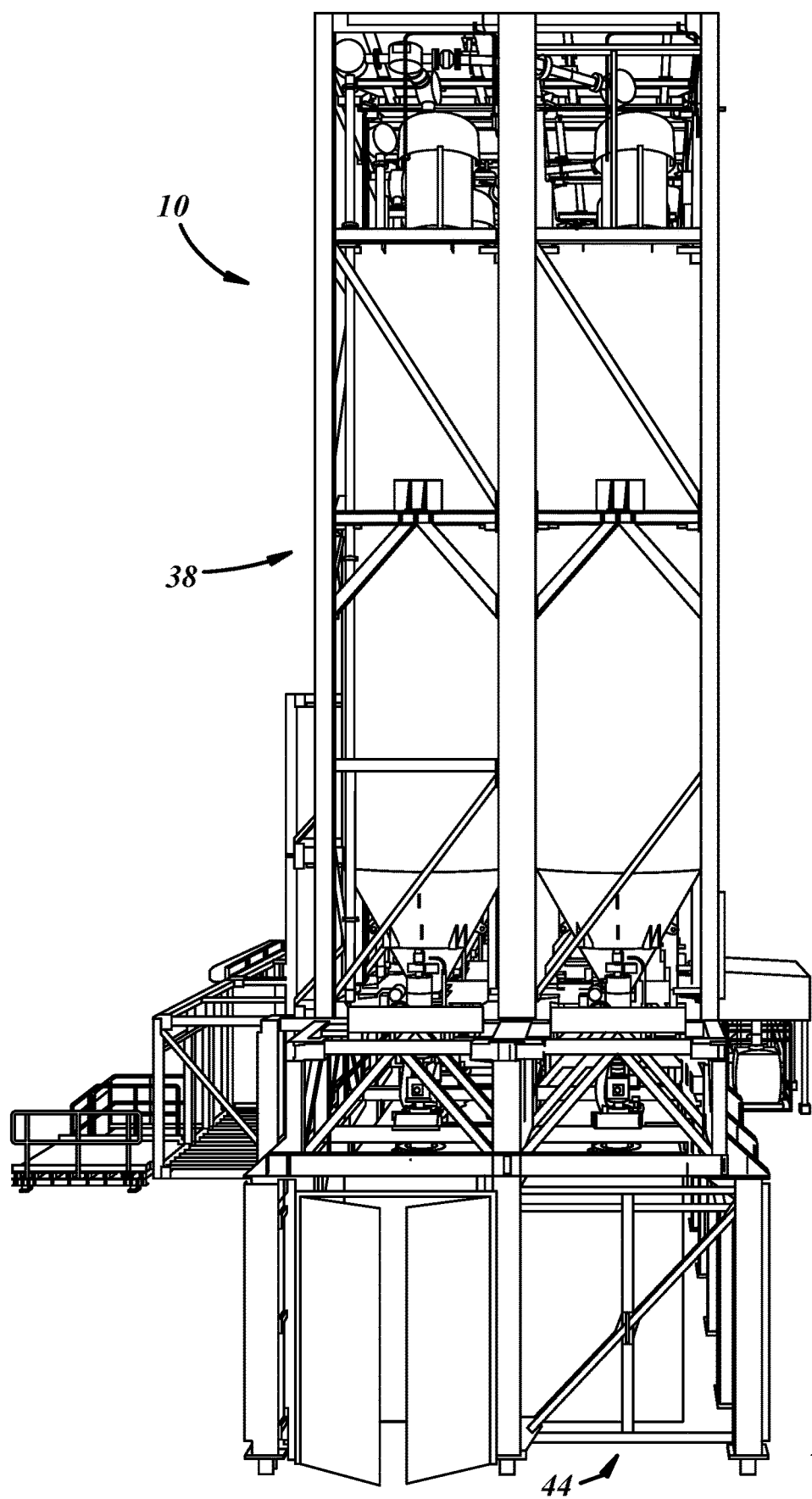
FIG. 5 is an end view of the system of FIG. 1A.
Figure 6:
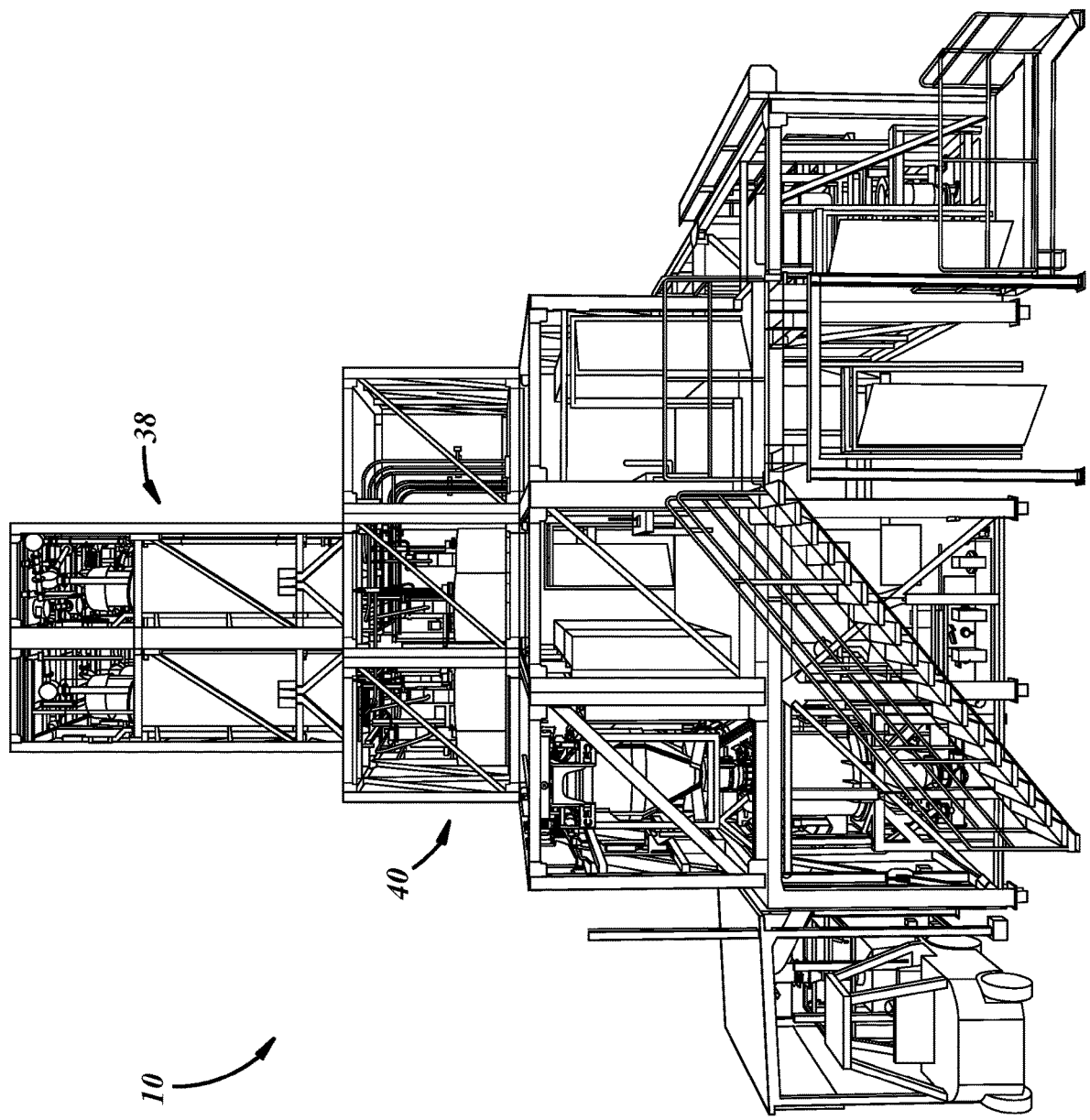
FIG. 6 is another end view of the system of FIG. 1A opposite that of FIG. 5.
Figure 7:
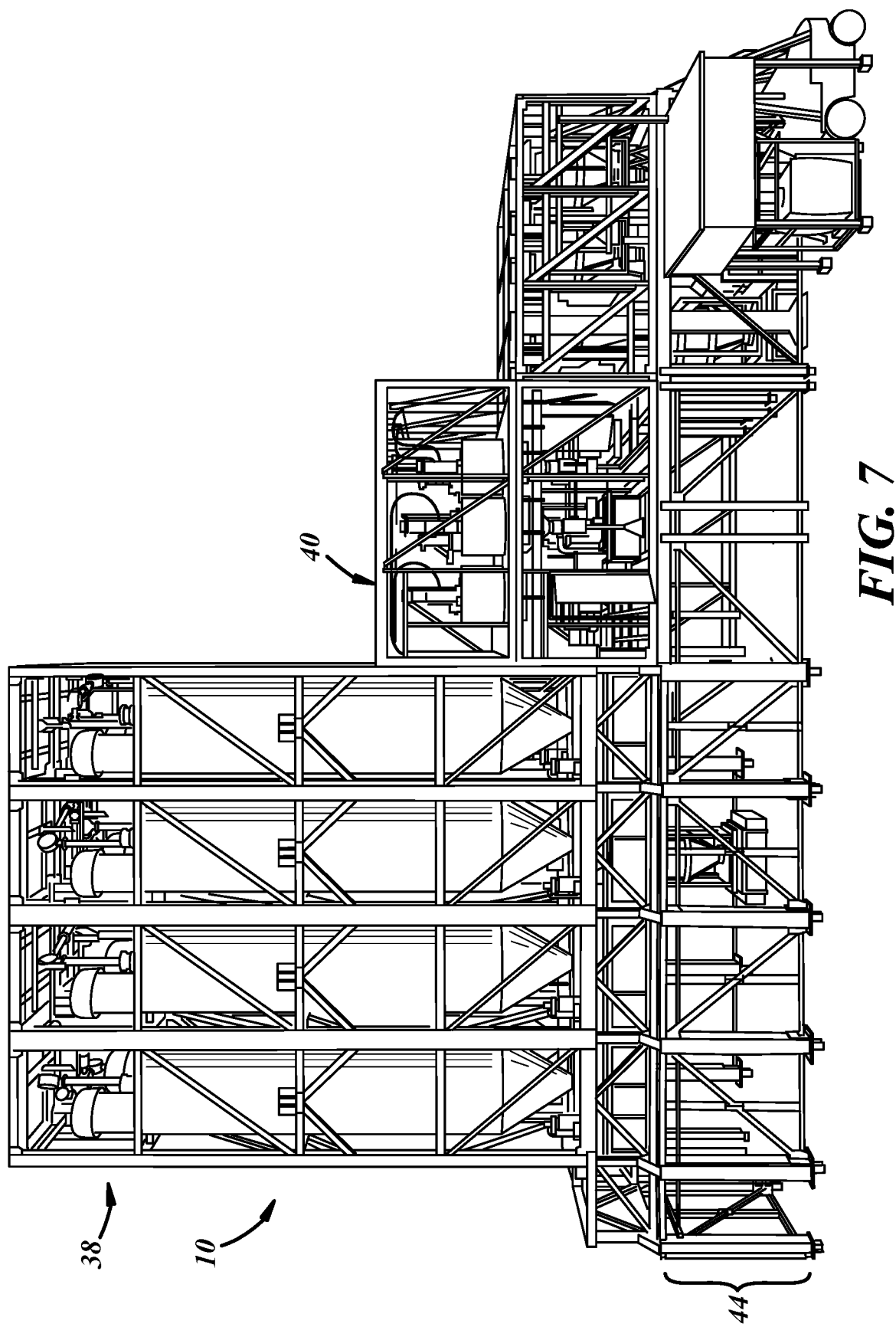
FIG. 7 is a side view of the system of FIG. 1A.
Figure 8:
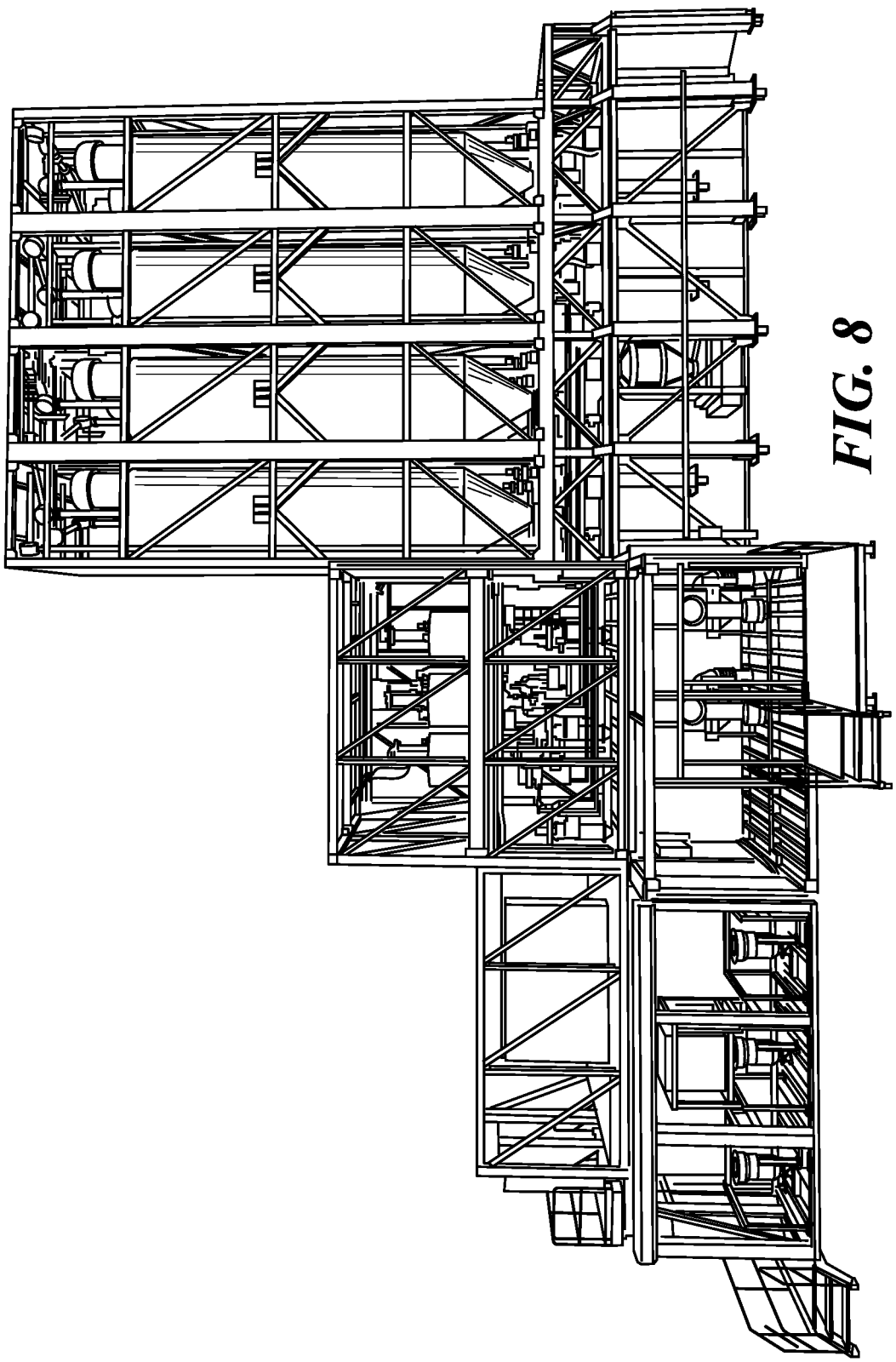
FIG. 8 is another side view of the system of FIG. 1A opposite that of FIG. 7.
Figure 9:
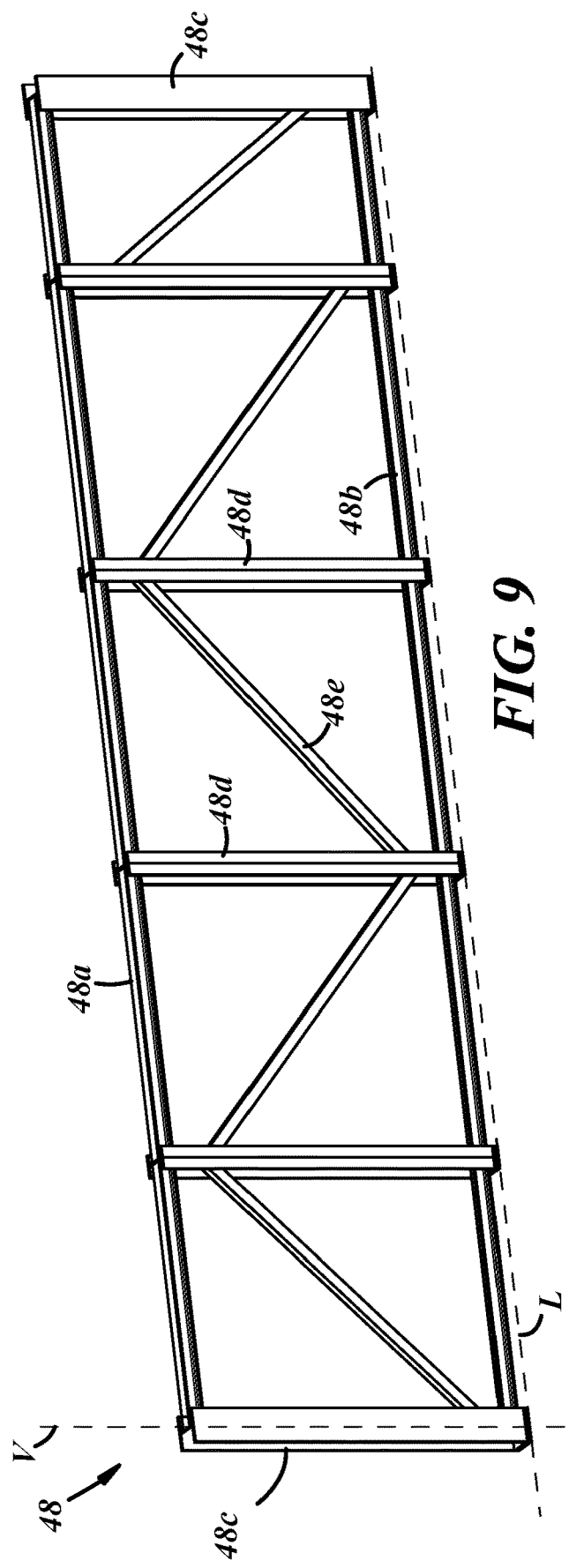
FIG. 9 is a perspective view of a modular frame of the system of FIG. 1A.

With reference to FIG. 9, a representative modular wall 48 of the first level 21 of the building is constructed as a rectangular truss, having a longitudinal axis L and a vertical axis V, and including lower and upper beams 48a,b extending longitudinally and being vertically opposed from one another. The wall 48 also includes vertically extending end posts 48c and intermediate posts 48d longitudinally between the end posts 48c, and struts 48e extending obliquely between the beams and connected to the posts 48c,d. The modular wall 48 is preassembled at an equipment fabricator, shipped from the fabricator to a product manufacturer, and is erected at the product manufacturer. The modular wall has exterior dimensions less than or equal to exterior dimensions of an intermodal freight container, more specifically, a height less than or equal to 9' 6" (2.896 m), a width less than or equal to 8' 6" (2.591 m), and a length less than or equal to 53' (16.154 m). As best illustrated in FIGS. 2B, 7 and 8, the modular wall 48 may be used as a portion of a base frame establishing the habitable first level of the system and spanning the majors subsystem, the minors subsystem, and the discharging subsystem. In the majors subsystem, the system also includes a dispensing level frame constituted from two of the horizontal modular dispensing frames 50 of FIG. 10 situated side-by-side and carried on the base frame, and a storage container frame constituted from eight of the vertical modular container frames 52 of FIG. 11 situated in a 4×2 array carried on the dispensing level frame.

Figure 10:
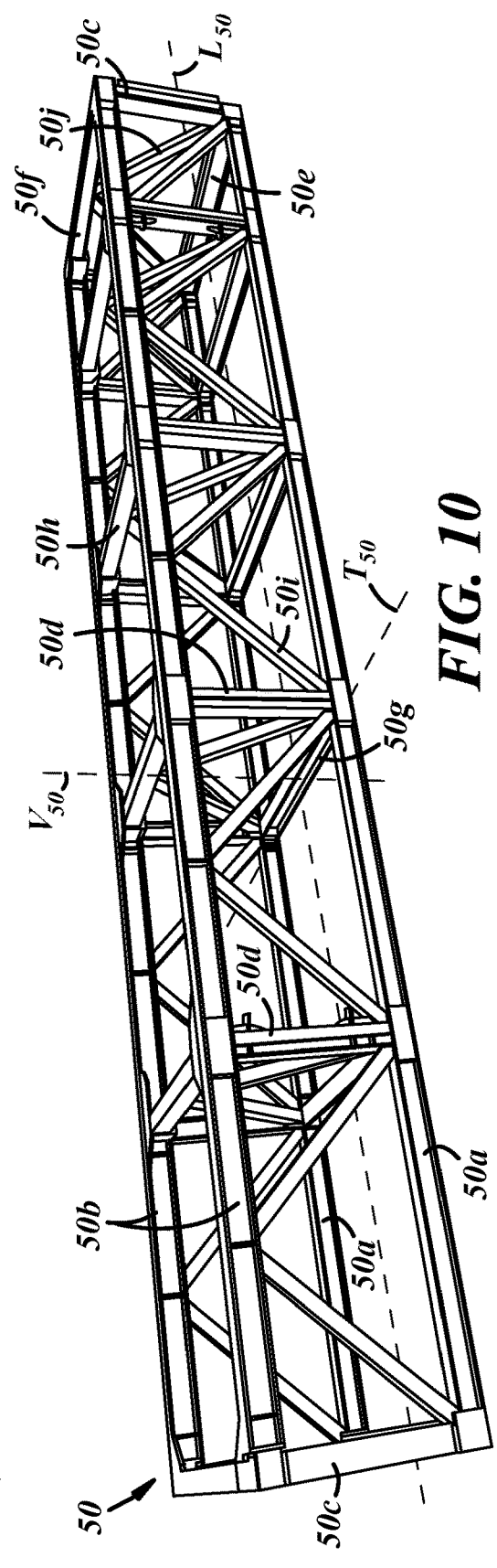
FIG. 10 is a perspective view of another modular frame of the system of FIG. 1A.

With reference to FIG. 10, a representative horizontal or dispensing module frame 50 is constructed as a rectangular box truss, having a longitudinal axis $L_{50}$, a transverse or lateral axis $T_{50}$, and a vertical axis $V_{50}$, including lower beams 50a extending longitudinally and being laterally opposed from one another, and including upper beams 50b extending longitudinally and being laterally opposed from one another. The frame 50 also includes posts 50c,d extending vertically between the lower and upper beams 50a,b and, more specifically, may include corner posts 50c extending vertically between ends of the lower and upper beams 50a,b, and intermediate posts 50d extending vertically between intermediate portions of the lower and upper beams 50a,b between the ends thereof. The frame 50 also includes lower end cross-members 50e extending laterally between the lower beams 50a, and upper end cross-members 50f extending laterally between the upper beams 50b. Likewise, the frame 50 also may include lower intermediate cross-members 50g extending between portions of the lower beams 50a between the ends thereof, and upper intermediate cross-members 50h extending between portions of the upper beams 50b between the ends thereof. The frame 50 may also include one or more side struts 50i extending obliquely between the lower and upper beams 50a,b and end struts 50j extending between lower and upper end cross-members 50e,f opposite longitudinal ends of the frame 50.

Figure 11:
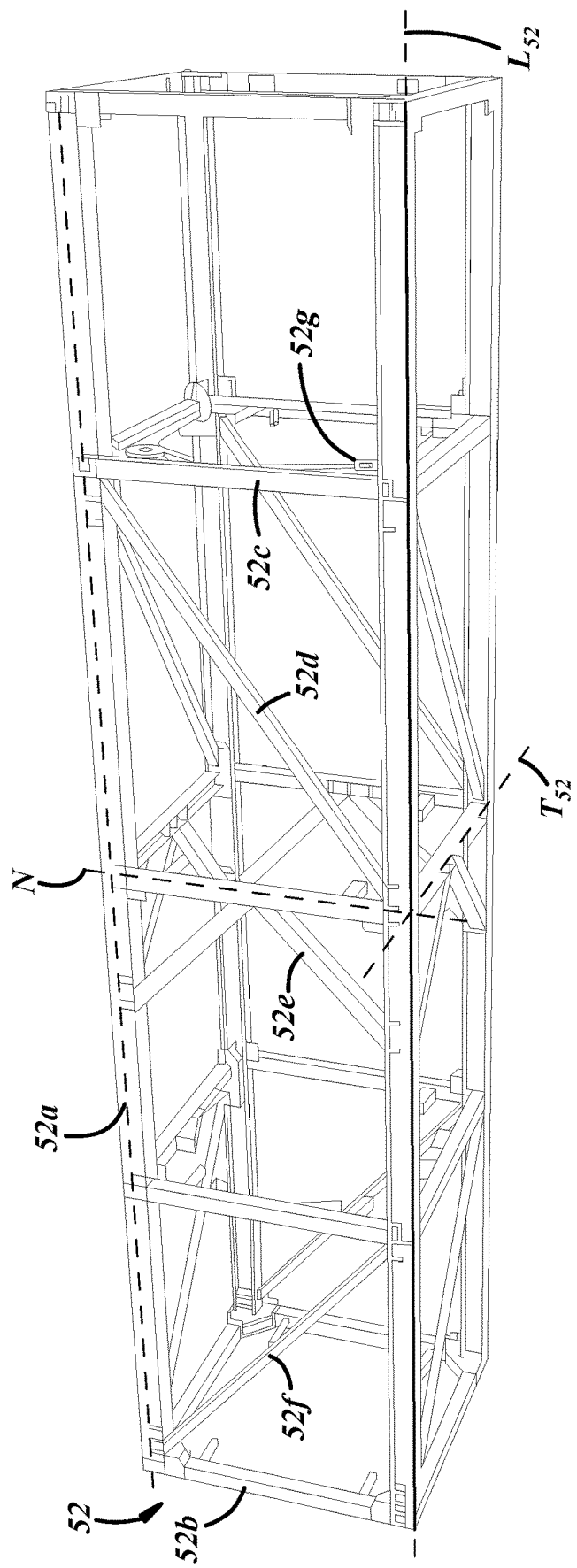
FIG. 11 is a perspective view of another modular frame of the system of FIG. 1A.

With reference to FIG. 11, a representative vertical or container modular frame 52 is constructed as a rectangular box truss, having a longitudinal axis $L_{52}$, a transverse or lateral axis $T_{52}$, and a normal axis N, and including corner beams 52a extending longitudinally, and being laterally and normally opposed from one another, and end cross-members 52b and intermediate cross-members 52c extending laterally and normally between the beams 52a. The frame 52 also includes one or more longer struts 52d extending obliquely between the beams 52a and may be attached to the beams 52a. The frame 52 further includes one or more shorter struts 52e extending between the beams 52a and a corresponding cross-member 52c, and one or more intermediate struts 52f extending between the beams 52a and coupled thereto. Finally, the frame 52 also may include platform brackets 52g coupled to upper intermediate cross-members 52c and configured to support a platform (not shown) thereon to establish a habitable attic level of the system.

Figure 12:
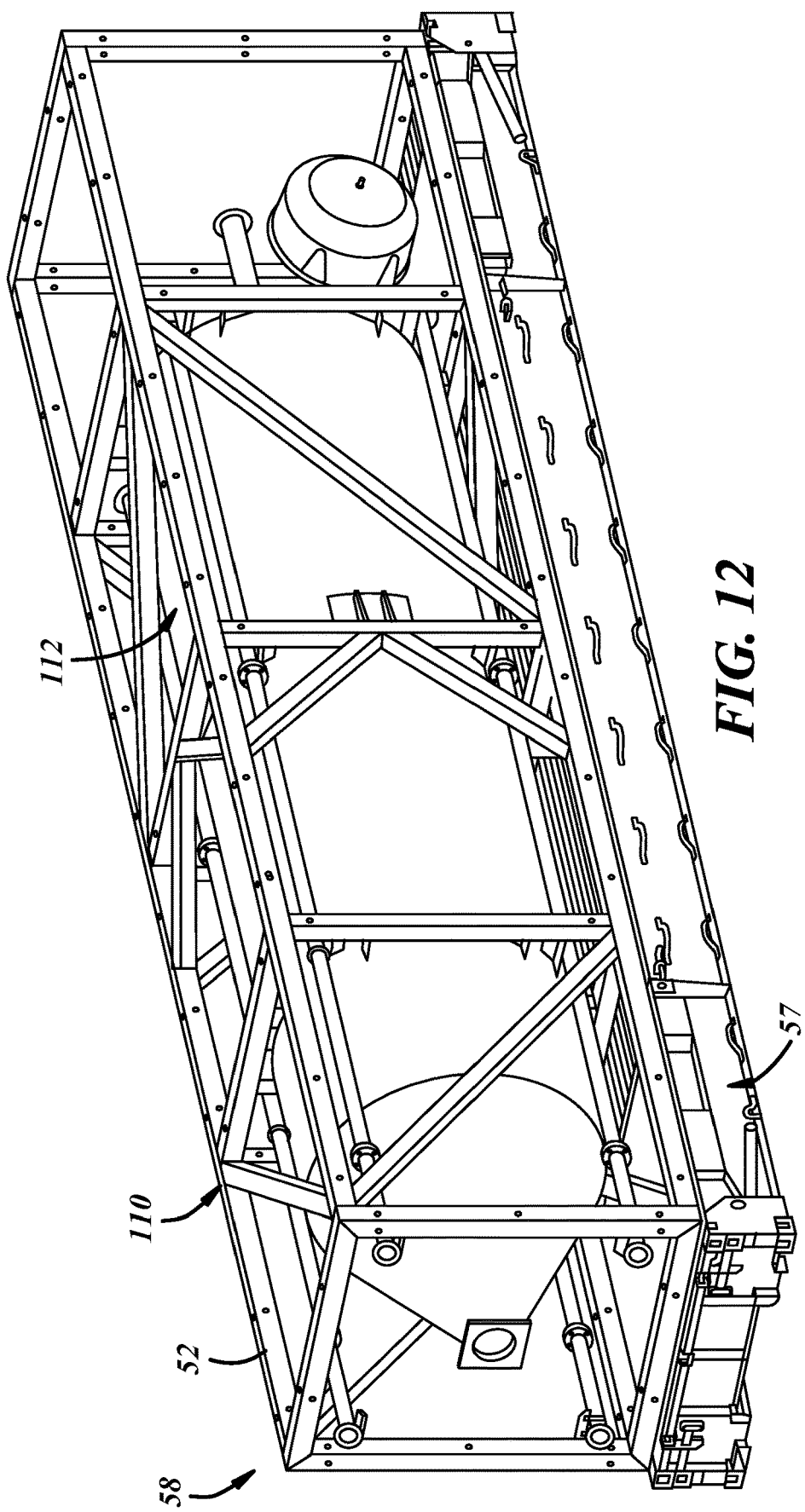
FIG. 12 is a perspective view of a bulk material storage module as part of a rack and module assembly.
Figure 13:
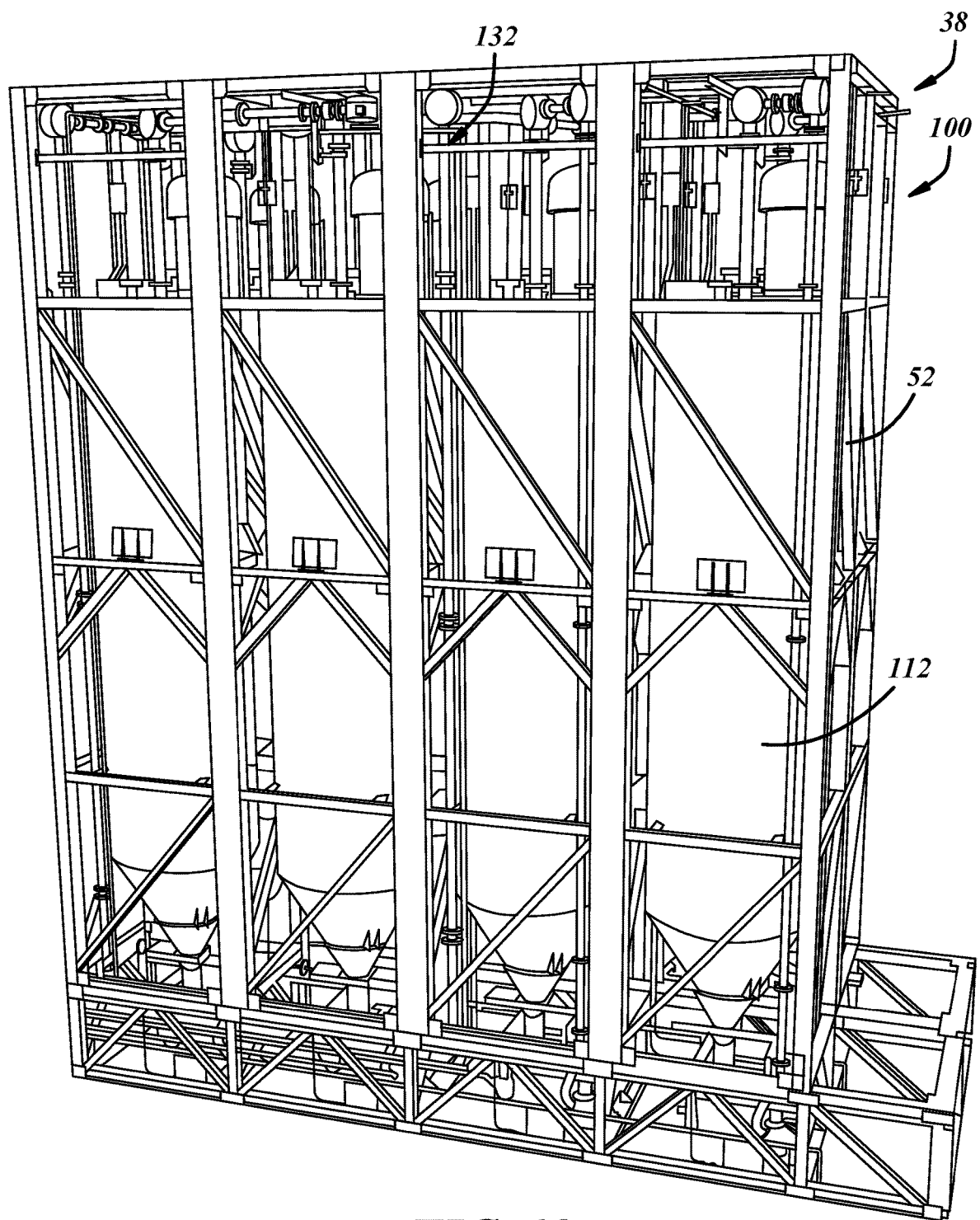
FIG. 13 is a perspective view of an illustrative modular bulk material storage and dispensing system.
Figure 14:
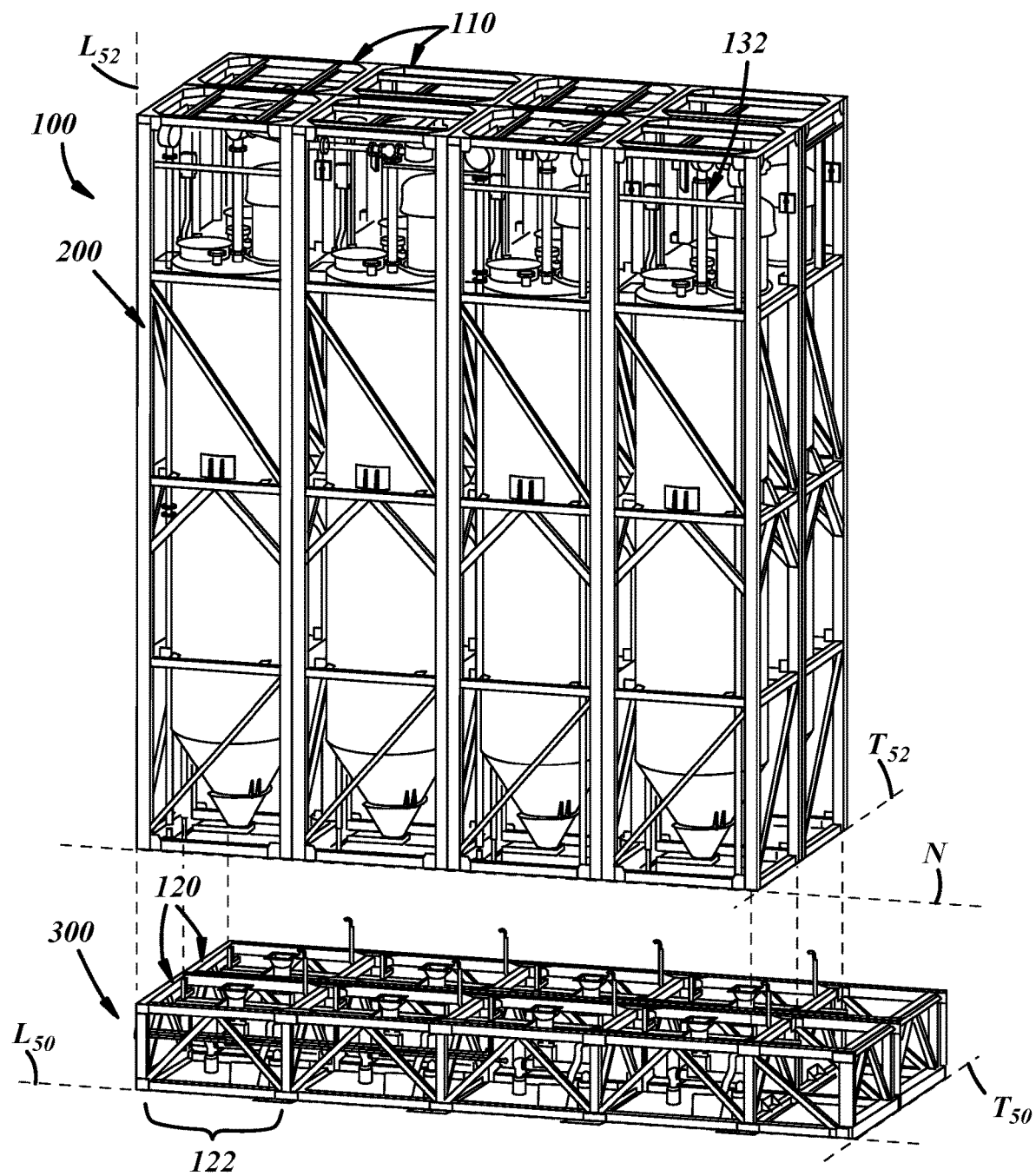
FIG. 14 is a partially exploded isometric view of the system of FIG. 13.
Figure 15:
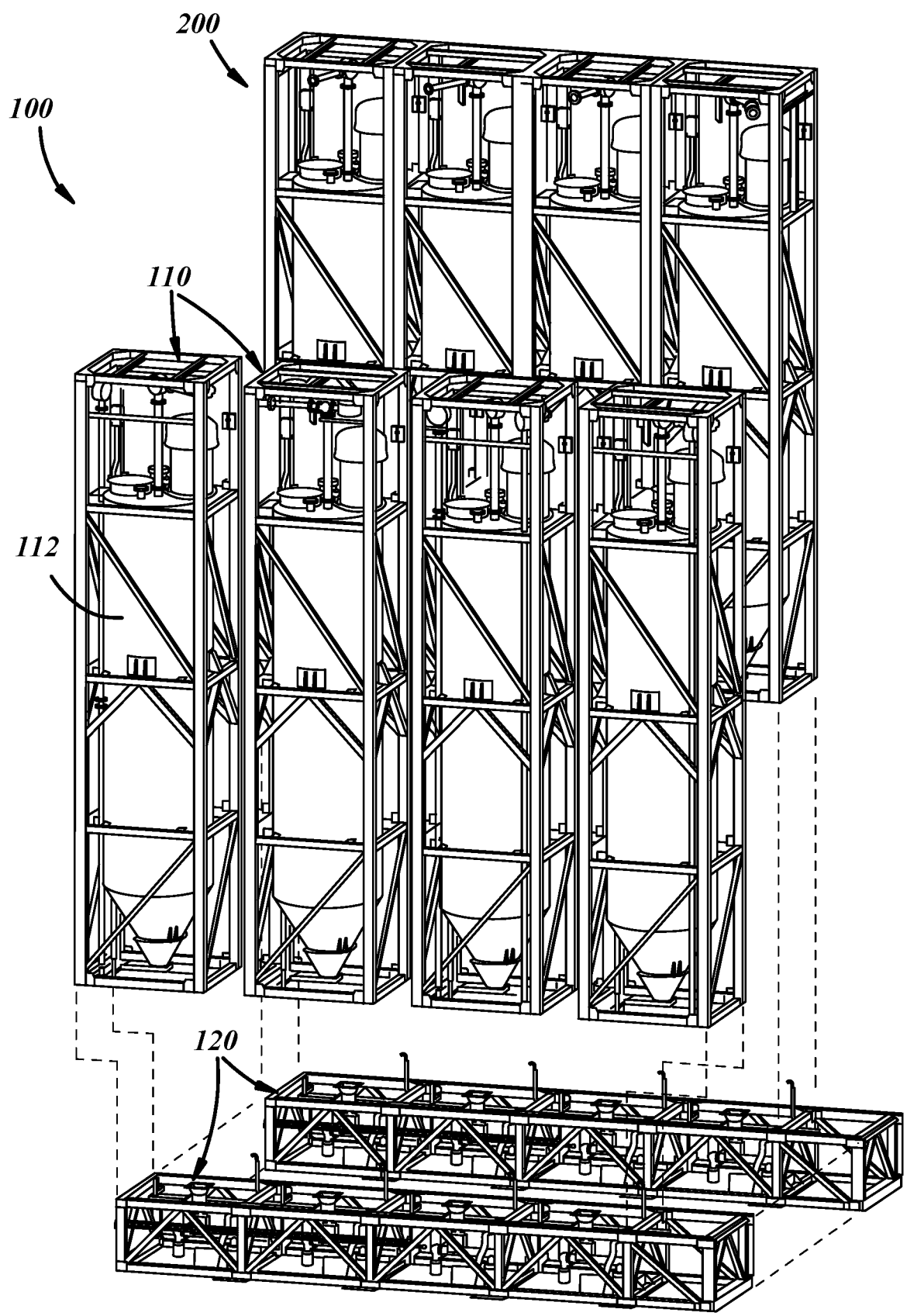
FIG. 15 is a further exploded isometric view of the system of FIG. 13.

With reference to FIG. 12, the modular storage container frame 52 can be shipped with or without the associated storage container equipment on a standard seagoing flat rack 57 like a Mafi trailer or the like to constitute a rack and module assembly 58. On trucks, the modular frame 52 (shipped as part of a module with equipment carried by the modular frame) is designed to be self-supporting and may be wrapped in plastic foil or sheet or truck tarpaulins (not shown) to seal against dust, dirt, and sea water/air, and bottoms and tops may be covered with planks or sheets (not shown) of wood, metal, or plastic to protect the equipment in the module. On ships, the module frame 52 and equipment may be placed on the rack 57 and rolled onto a roll on/roll off ship at a departure seaport and, at an arrival seaport, the rack 57 is rolled off the ship and the module is placed on a truck. Accordingly, the module can be placed in a closed belly of the ship and not be exposed to sea water.

The same can be said for the dispensing modular frame 50 of FIG. 10, which in some cases can be stacked in pairs one over the other with overall external dimensions equal to or less than those of an intermodal freight container and supported on a standard seagoing flat rack 57 like a Mafi trailer or the like to constitute a rack and module assembly 58. In fact, the different modular frames 50, 52 may share one or more common exterior dimensions such as dimensions along their respective transverse axes $T_{50}$, $T_{52}$ and be easily aligned with one another to facilitate positioning and assembling them together on site.

With reference again to FIGS. 1A-8, the majors system 38 is configured to receive, pneumatically convey, store, and gravity dispense majors bulk material. Glassmaking majors may include sand, soda, limestone, alumina, saltcake, and, in some cases, dust recovery material. In general, the majors system 38 is the tallest of the subsystems and is supported over a portion of the transport subsystem 44 and thus has its bottom aligned with the bottom of the second level 22 of the system 10 and extends upward to the attic level 24.

With reference to FIGS. 13-16, the majors system 38 includes a bulk material storage and dispensing system 100 including an array 200 of bulk material storage container modules 110 atop an array 300 of bulk material dispensing modules 120. The majors system 38 also includes a pneumatic bulk material receiving and conveyance system 130 including the above-mentioned receiving conduit 39 coupled with a conduit system 132 carried by the storage container array 200. The storage and dispensing system 100 is both intramodular and intermodular, meaning that each of the different types of modules 110, 120 are modular amongst their own kind and are additionally modular with one another.

In the illustrated example, each storage container module 110 includes an individual bulk material storage container 112 carried by a corresponding storage container frame 52, and each dispensing module 120 includes the dispensing module frame 50 with a plurality of dispensing cells 122 defined between dispensing frame crossmembers 50h, 50g. The dispensing modules 120 are configured to carry a bulk material dispenser 124 in each cell 122. The intramodularity of the modules 110, 120 is by virtue of the respective frames 52, 50 being identical among their own kind. The intermodularity of the modules 110, 120 is by virtue of certain dimensions of the frames 50, 52 being the same. In this example, the frame 52 of each storage container module 110 has the same transverse dimension as the frame 50 of each dispensing module 120, and the longitudinal dimension of each dispensing cell 122 is the same as the width or normal dimension of each storage container module frame 52.

Accordingly, each dispensing module 120 can support an 1×n array 200 of storage container modules 110, where n is the number of dispensing cells 122. Here, each dispensing module 120 includes four dispensing cells 122, which is the maximum number possible when the module 120 has a longitudinal dimension equal to or less than that of an intermodal freight container and when each container module 110 has a width equal to or less than the height of an intermodal freight container. The same dispenser module 120 can alternatively carry a smaller number of storage container modules 110 with the capacity to add more at a later date. The dispensing module array 300 in this case is a 1×2 array, with each module 120 including four dispensing cells, and the storage container array 200 is a 2×4 array.

Figure 16:
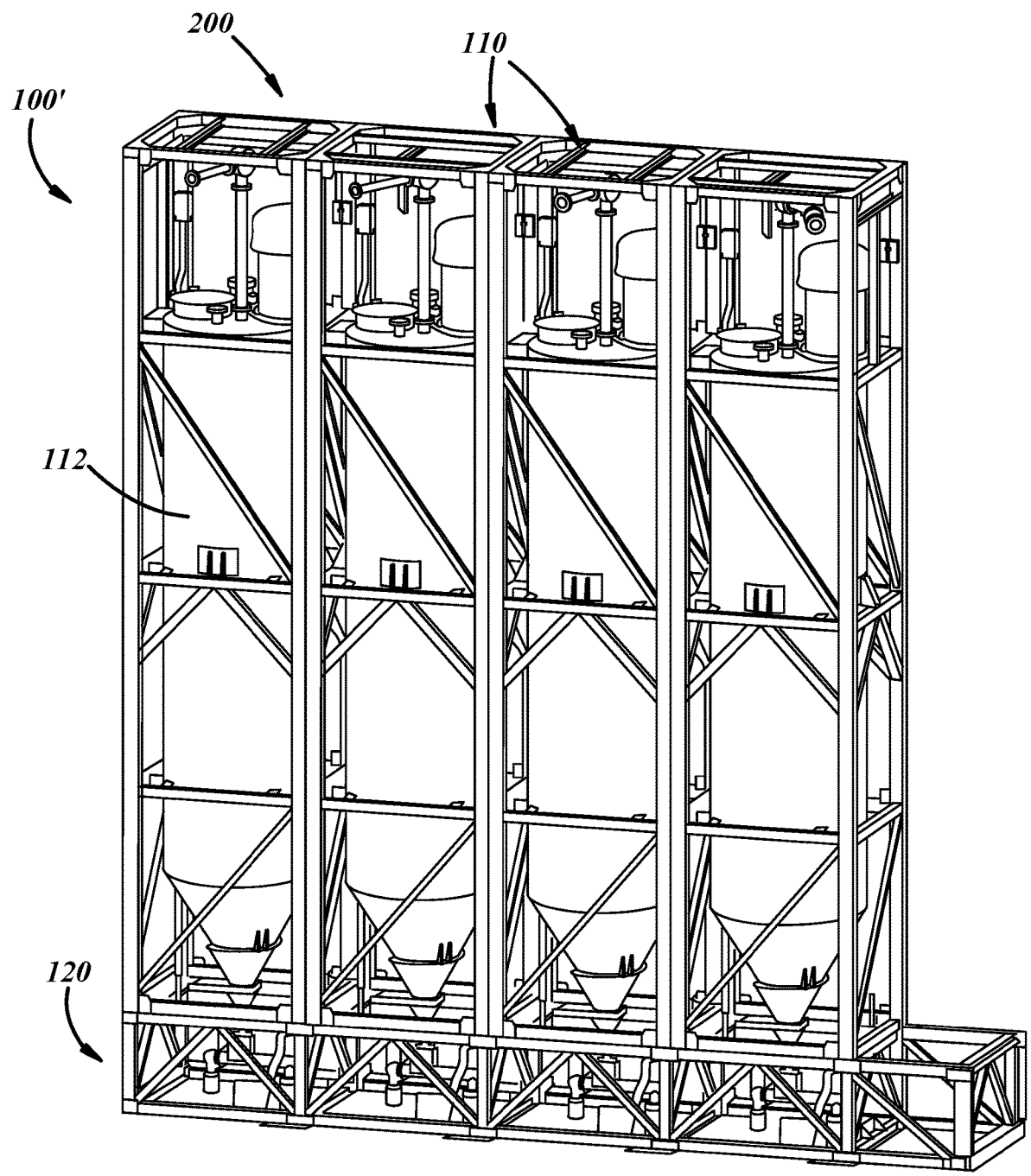
FIG. 16 is an isometric view of an array of another modular bulk material storage and dispensing system.

FIG. 16 illustrates another modularity feature of the of the modules 110, 120 in the form of a storage and dispensing module 100' which is itself modular. The system 10 of FIGS.

1A-8 includes two of the modules 100' of FIG. 16 with the capability to add one or more additional dispensing modules 120, storage modules 110, or storage and dispensing modules 100'.

With reference to FIGS. 17-18, each bulk material storage module 110 may include the container module frame 52, the bulk material storage container 112 supported within the frame, a platform 114, a utilities receiver 116, and a portion of the conduit system 132. In this example, the bulk material storage container 112 is a silo having a first or upper portion 118, a second or lower portion 126, an inlet 128 located along the upper portion for receiving bulk material into the material container, and an outlet 134 located along the lower portion for discharging bulk material from the material container.

The inlet 128 receives bulk material from the conduit system 132, and each module 110 includes at least a downpipe or vertical inlet conduit section 136 of the conduit system 132 coupled with the inlet 128 and a horizontal connector conduit 138 of the conduit system configured to be coupled with another portion of the conduit system carried by an adjacent module. Each module 110 includes conduit supports 140 at the top of the frame 52 for supporting the horizontal connector 138 of FIG. 18 as well as other horizontal connectors 138' (FIG. 17) of the conduit system 132 that are merely routed through the module framework to interconnect surrounding modules.

The silo 112 is configured for gravity discharge of the bulk material from the outlet 134, which is at the bottom of a spout 142 connected to a lower conical part of the lower portion 126 of the silo. The illustrated silo 112 has a shut-off valve 144 in the form of a transverse plate that can be manually or actuator-driven across the outlet 134 to close it for maintenance of the attached dispensing system, for example.

The platform 114 at least partially surrounds the upper portion 118 of the bulk material container 112 and is level with the top of the silo in this example, thus forming a habitable maintenance space between the top of the silo and the top of the frame 52. The top of the silo 112 includes an access hatch 146, a filter assembly 148, a fill-level sensor 150, a pressure sensor 152, a high-pressure relief valve 154, and/or other components. The filter assembly 148 is passive and contains a filter element to remove solids from the air in the silo 112 displaced by incoming bulk material before venting the air to the atmosphere. The filter assembly 148 may double as a vent to permit air exchange between the inside of the container 112 and outside the container during receiving and/or discharging of bulk material. The fill-level sensor 150 may be radar-based and thus detect the real-time amount of bulk material in the silo as well as the instant rate of filling or discharging. Other types of fill-level sensors such as lidar or load cells can be employed. Each of the sensors, gauges, and/or valves of the silo 112 may be in communication with a system controller (e.g., of the controls subsystem 46) configured to receive information about the storage module 112 and/or to control those connected components in response to the received information or to other received system information.

The utilities receiver 116 in this case is a junction box for connecting electric power to the module to power sensors, gauges, and other equipment and for placing the above-platform components to controllers located elsewhere in the overall system 10.

As noted above, the storage container module 110 is intramodular, each having the same external dimensions and being configured to be attached side-by-side with up to four other bulk material storage modules and corner-to-corner with up to four other bulk material storage modules. Each module 110 is also sized to fit atop an individual dispensing cell 122 of an underlying dispensing module 120. When arranged together in the array 200 of the previous figures, the platforms 114 of each module 110 together form a continuous floor or bottom of the maintenance space or attic, where a person is able to access all of the components on top of each silo and the associated pneumatic conduit system 132 all in one space without the need to climb up and down ladders along the side of each individual silo to do so.

Figure 19:
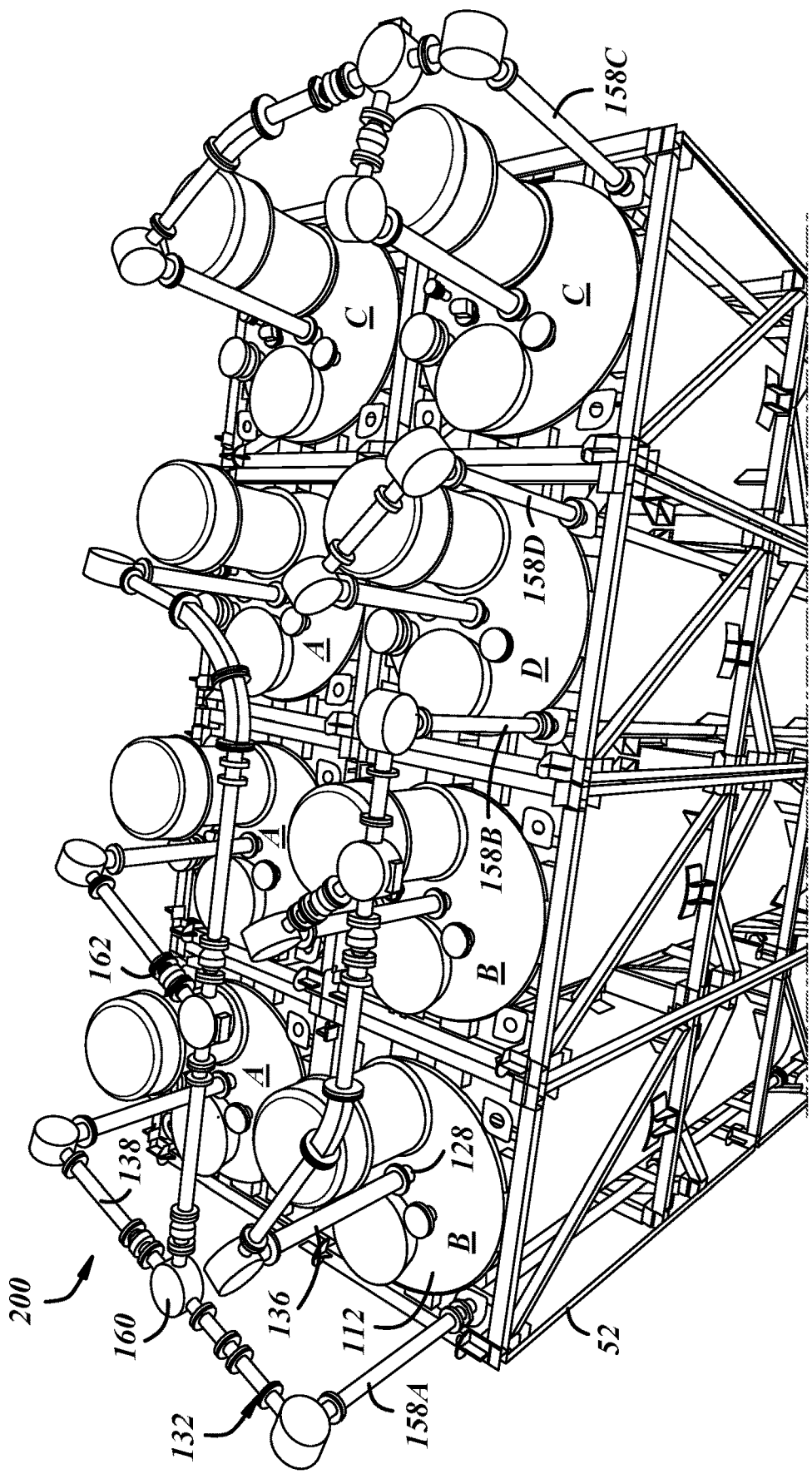
FIG. 19 is a top perspective view of an array of storage container modules of the system of FIG. 13 with a top portion of the module frames omitted.

FIG. 19 is a top perspective view of the storage container array 200 with portions of the module frames 52 omitted for a full view of the conduit system 132. The conduit system 132 includes all of the vertical downpipes 136 that lead to each silo inlet 128, all of the horizontal connector conduit sections 138, vertical feed pipes or up-pipes 158A-D, three-way junctions 160 interconnecting some of the horizontal connectors 138, and valves 162 for regulating the flow of bulk material through the conduit system 132.

For purposes of illustration of one particular embodiment, the silos 112 of the illustrated array 200 are labelled A-D, indicating four different types of bulk material intended to be received by, stored in, and discharged from each silo 112. In embodiments in which the system 10 is a glass feedstock handling system, three of the silos (A) may contain sand, two of the silos (B) may contain limestone, two of the silos (C) may contain soda ash, and one of the silos (D) may contain alumina. One vertical feed pipe 158A-D is dedicated to each different material type, and each of these feed pipes 158A-D is at an inlet end of the conduit system 132. Each of the feed pipes 158A-D is coupled with a dedicated segment of the pneumatic receiving conduit 39 leading outside the installation 12, and represents a branch of the conduit system 132. The feed pipes 158A-D are located along a side of the array 200 closest to the exterior wall of the installation 12 through which the segments of receiving conduit 39 extend.

Branches leading to a single silo 112, such as branch 158D in this case, do not include a three-way junction 160 or valve 162 because the branch exclusively feeds that one silo. Branches leading to more than one silo include a number of junctions 160 equal to one less than the number of silos being fed by that branch and a number of valves 162 equal to (X−1) multiplied by 2, where X is the number of silos being fed by that branch. In this example, the 158A branch feeds three silos and thus has two junctions 160 and (3−1)×(2)=4 valves 162. The 158B-C branches feed two silos each and thus have one junction 160 each and (2−1)×(2)=2 valves each.

Figure 20A:
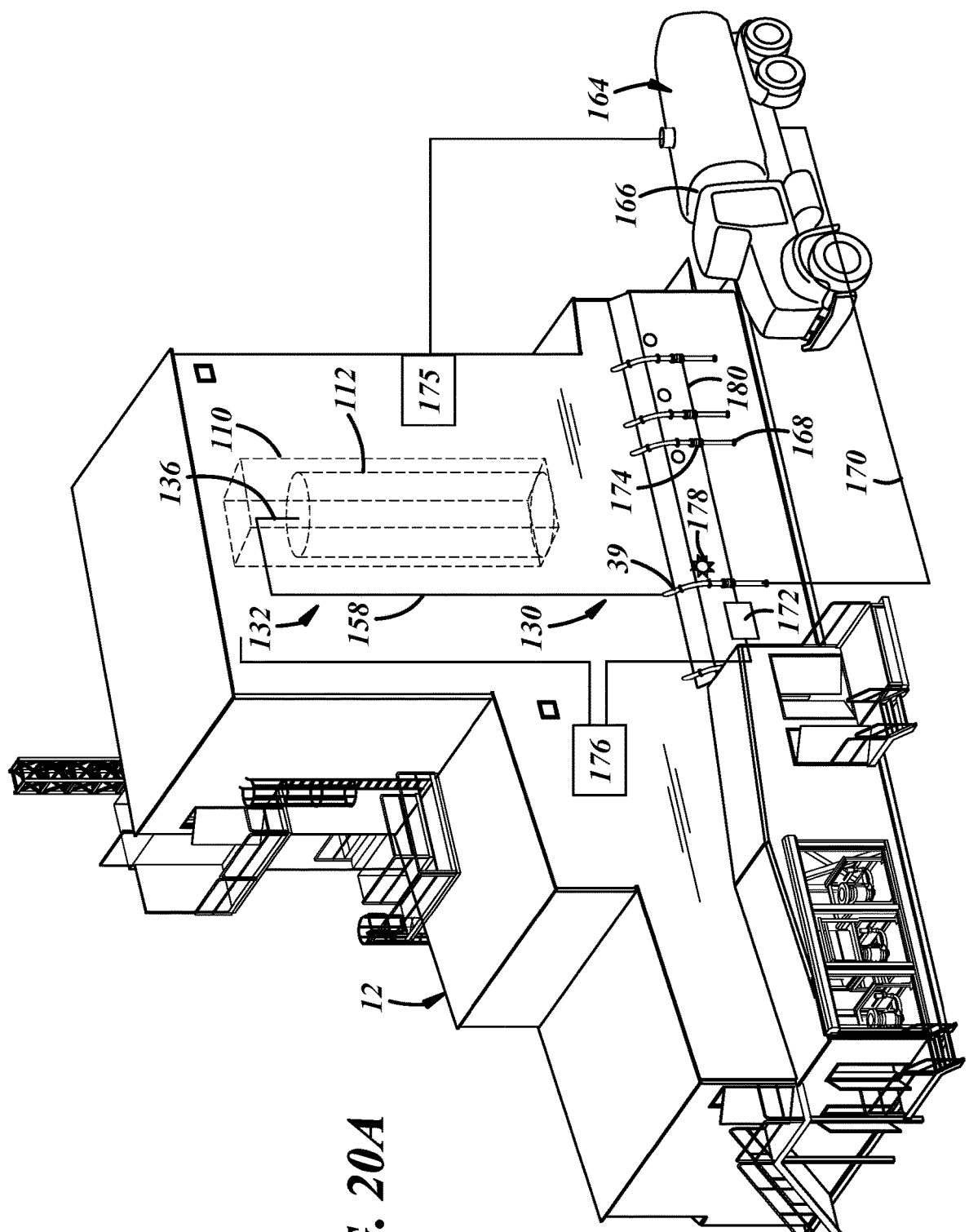
FIG. 20A is the installation of FIG. 1A illustrated with a mobile bulk material container arrived at the installation to convey bulk material to the stationary bulk material containers of the installation with elements of a pneumatic conveying system additionally illustrated.

With continued reference to FIG. 19 and additional reference to FIG. 20A, which illustrates the installation 12 of FIG. 1A with a bulk material transport vehicle 164 delivering bulk material to the majors system, the conduit system 132 including the three-way junctions 160 and valves 162 is operable as part of the receiving and pneumatic conveyance system 130 to provide a bulk material handling method that includes conveying bulk material from a mobile bulk material container 166 into a stationary bulk material container 112 at a glass manufacturing facility. For simplicity in illustration, only a single silo 112 of one bulk material storage module 110 of the array is illustrated schematically inside the installation 12 in FIG. 20A. As shown in FIG. 20A, in addition to the conduit system 132 carried by the silo array 200, the bulk material receiving and pneumatic conveyance system 130 may additionally include one or more pneumatic bulk material inlet conduits 39 extending through a wall of the installation 12, a plurality of couplings 168 configured to couple a feed conduit 170 of the mobile bulk material container 166 with the conduit system 132 via the inlet conduits 39, a receiving terminal 172, valves 174 operable to open and close to connect and disconnect each coupling 168 with the respective inlet conduit 39, a dense phase pneumatic panel 175, a controller 176, indicators 178 to communicate to a user the proper coupling 168 to use, and utility lines 180 coupling the terminal 172 and/or the controller 176 with the valves 174. In FIG. 20A, the pneumatic panel 175 and controller 176 are illustrated schematically because they may be located remotely—i.e., somewhere else in the installation 12.

In this example, the mobile bulk material container 166 is part of a transport truck 164 that is able to pull-up next to the installation without the limitations of rail cars, although rail cars may still be used. The system 130 is designed to pneumatically convey bulk majors materials from the mobile container 166 to one or more silos 112 of the array 200. Conventionally, it has not been possible to use pneumatic conveying to fill glass majors containers directly because conventional pneumatic conveying is dilute phase conveying in which air pressure at the inlet side of the system blows the bulk material through conduits as fast as the bulk material can be added to the flow of air in the conduits. While this is not problematic with other silo-containing facilities, it is problematic with abrasive glass feedstock materials such as sand and limestone. Conventional dilute phase pneumatic conveying of such abrasive materials quickly wears down the inner wall of the conduit—particularly at 90-degree or other sharp turns of a conduit system.

The pneumatic receiving and conveying system described here uses dense phase pneumatic conveying to address the conduit wear problem. In dense phase conveying, a series of spaced-apart slugs or packets of the bulk material are conveyed through the conduit system 132. Dense phase conveying operates at a low air velocity in comparison to dilute phase conveying, which keeps the dense slugs of material together while being conveyed. The slower conveyance speed relative to dilute phase conveying significantly reduces conduit wear with abrasive bulk materials. The dense phase system requires an unconventionally high pressure to move the material through the conduit system. Dense phase conveying may for example required inlet pressure on the order of 20-30 psi compared to the relatively low pressure of 10-15 psi required for dilute phase conveying. Dense phase conveying can be somewhat more expensive than dilute phase conveying due to the lower feed rates and more complex equipment. But in the case of abrasive glass feedstock materials, the additional costs may be at least partly offset by the ability to eliminate subterranean material pits and bulk material elevators from conventional majors feedstock systems. Another benefit of pneumatic conveyance is the ability to operate a closed pneumatic system throughout the installation and, thereby, an essentially dust-free batch house, which is entirely unknown to the glass industry and some other industries that rely on bulk material handling systems.

Mobile bulk material containers such as pneumatic trailers typically used to deliver and unload bulk materials are generally incapable of sustaining the higher hopper and conveyance line pressures required for dense phase conveying, particularly in the United States. While other industries may employ dense phase conveying of particulate materials within manufacturing or processing facilities, pneumatic unloading from a delivery trailer or railcar is typically via dilute phase only. Then, a specialized dense phase system is provided and used only within the manufacturing or processing facility for intra-plant conveyance. Disclosed herein is a pneumatic unloading system in which the bulk material is unloaded directly from a pneumatic trailer or other mobile bulk material storage container and into the silos or other stationary bulk material storage containers via dense phase conveying. Here, the mobile hoppers and conveying lines leading from the mobile delivery vehicle are pressurized at the higher pressure required for dense phase conveying. It has been found during development of this system that fleets of delivery vehicles and pneumatic unloading trailers must be retrofitted, as bulk material delivery companies have balked at requests for high-pressure capable delivery containers.

Figure 20B:
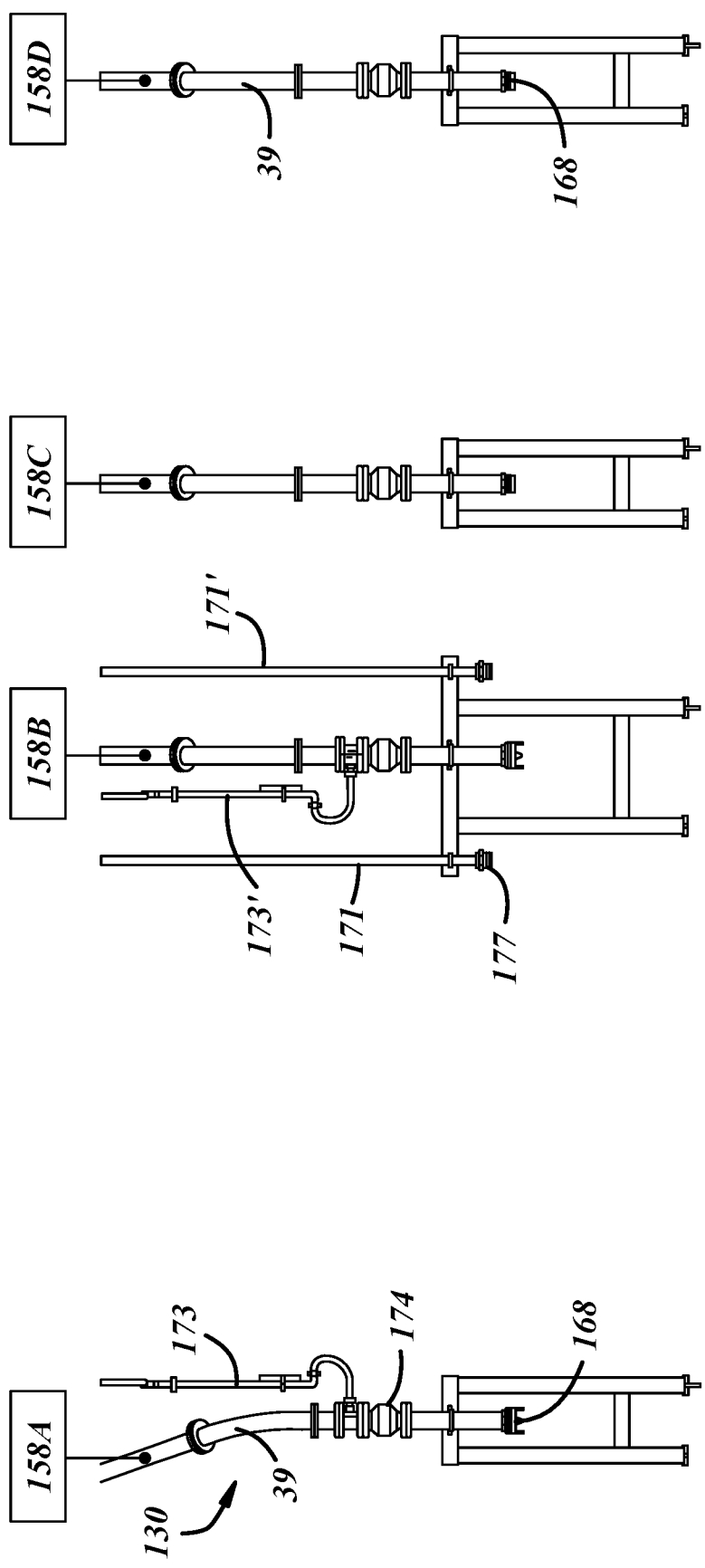
FIG. 20B is an elevation view of the inlet conduits of FIG. 20A, further illustrating high-pressure lines and pulse-pressure lines for use in dense phase conveying of bulk material.
Figure 20C:
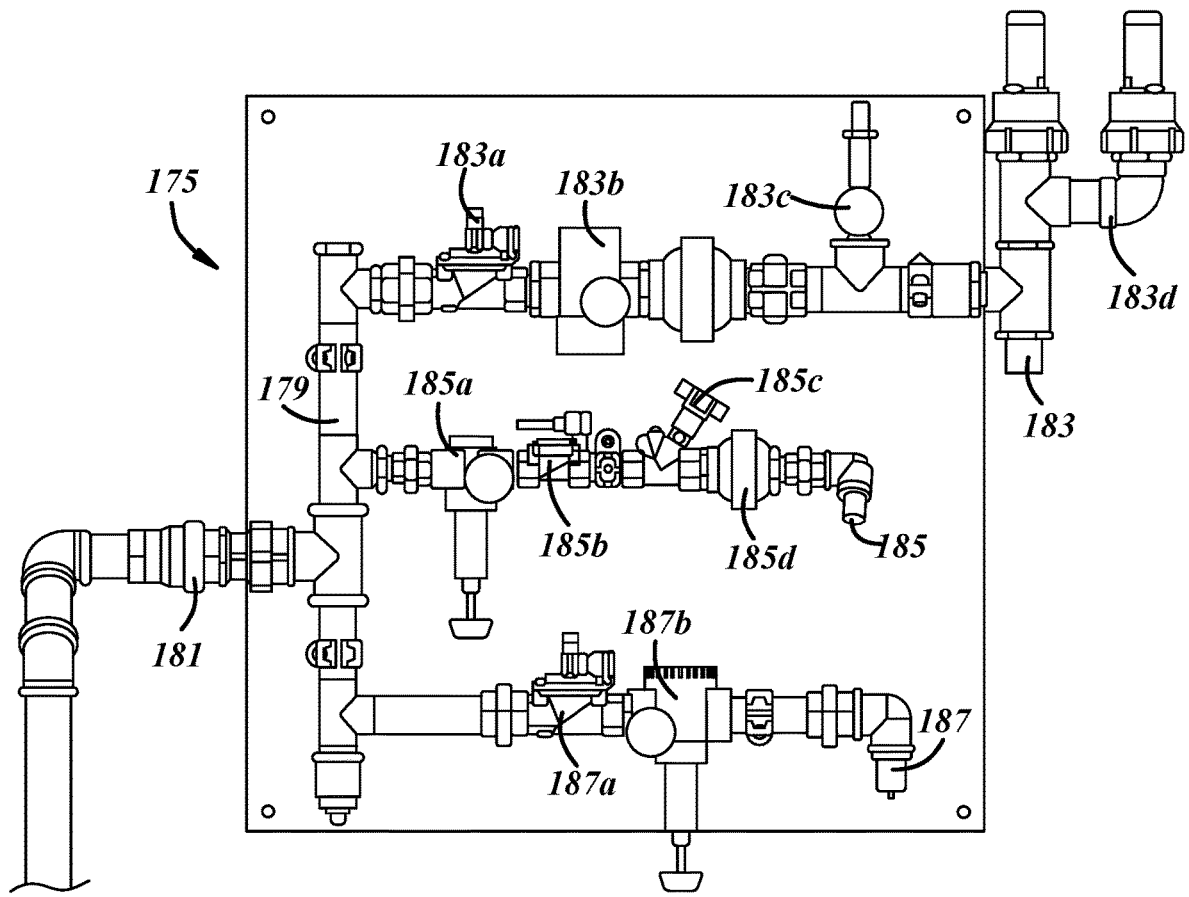
FIG. 20C is an isometric view of a pneumatic panel configured to provide elements of the dense phase conveying system.
Figure 20D:
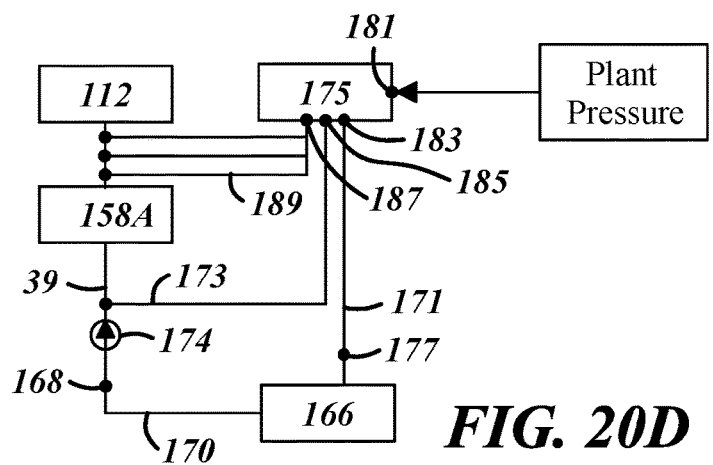
FIG. 20D is a schematic representation of a mobile bulk material storage container coupled with the pneumatic dense phase conveying system.

FIGS. 20B-20D illustrate portions of the pneumatic system 130 of FIG. 20A in greater detail in order to further explain dense phase conveying and how it is accomplished. FIG. 20B illustrates the pneumatic inlet conduits 39, couplings 168, and valves 174 of the pneumatic system 130 of FIG. 20A. In addition, FIG. 20B illustrates high-pressure lines 171 and pulse-pressure lines 173 of the system 130. FIG. 20B is also schematically labelled to indicate which branch 158A-D of the conduit system 132 each inlet conduit 39 may be coupled with where the illustrative array 200 of FIG. 19 is employed. In this example, only two of the four inlet conduits 39 have one of the pulse-pressure lines 173 associated therewith. The number of high-pressure lines 171 is equal to the number of pulse-pressure lines 173, and a high-pressure coupling 177 is provided at the end of each high-pressure line.

The two branches 158A, 158B of the conduit system 132 with associated pulse-pressure lines 173 employ dense phase pneumatic conveying, while the other two branches 158C, 158D employ dilute phase conveying. Where the system 10 is a glass feedstock handling system, the most abrasive feedstock materials—e.g., sand and limestone—may be conveyed using the dense phase branches 158A, 158B. Each dense phase branch may have a dedicated high-pressure line 171 as illustrated. In this case, one high-pressure line 171 is associated with branch 158A, while the other high-pressure line 171' is associated with 158B. Likewise, each dense phase branch 158A, 158B may have a dedicated pulse-pressure line 173, 173'. Each pulse-pressure line is coupled with the respective inlet conduit 39 near the valve 174 that provides or blocks bulk material conveying into the conduit system 132.

Each high-pressure coupling 177 is adapted to be coupled with the mobile bulk material container 166 such as that of FIG. 20A via a second conduit between the coupling 177 and the container 166. The high-pressure line 171 provides the pressure to push the bulk material into the conduit system 132 in dense slugs or segments.

FIG. 20C illustrates the pneumatic panel 175 of FIG. 20A in further detail. The panel 175 includes a pneumatic manifold 179 with one air inlet 181 and three air outlets 183, 185, 187. The panel 175 can be located remotely, away from the conduit system 132 and silo array 200, for example. In one embodiment, the pneumatic panel is located in a module of the minors subsystem 40 (FIG. 1B), which may be a more centralized location of the installation 12 than the bulk material receiving area. Additionally, the minors subsystem 40 may also employ pneumatic conveying systems, and locating majors and minors control panel together within the installation can centralize control and maintenance of the two pneumatic conveying systems.

The air inlet 181 is coupled with an air compressor or other pressure source, such as a standard manufacturing plant air pressure system. A first outlet 183 is coupled with one of the high-pressure lines 171 of FIG. 20B. The associated high-pressure line 171 may be maintained at 20-30 psi from the first outlet 183 and pressurizes the mobile bulk material container when coupled therewith. Various pneumatic components between the inlet 181 and first outlet may include a 2-way magnetic valve 183*a*, pressure regulator 183*b*, check valve 183*c*, pressure sensor/gauge 183*d*, and safety valve 184*e*. The magnetic or solenoid valve 183*a* may be controlled remotely via a controller or control system and is one of the valves that may be opened once the associated high-pressure line 171 is coupled with the delivery vehicle 164 or other mobile bulk material storage container 166. Other types of remotely controllable valves may be employed, and the panel 175 may include additional components between the inlet 181 and first outlet 183.

The second outlet 185 of the manifold 179 is coupled with one of the pulse-pressure lines 173 of FIG. 20B. The associated pulse-pressure line 173 has a non-uniform pressure during conveying with periodic high-pressure pulses and an otherwise low or zero baseline pressure between pulses. Various pneumatic components between the inlet 181 and second outlet 185 may include a pressure regulator 185*a*, a 2-way magnetic valve 185*b*, a volume regulator 185*c*, and a check valve 185*d*. Pressure pulses can be generated via a time-dependent or otherwise controllable valve of the panel 175, such as the magnetic valve 185*b*, which can be controlled remotely via a controller or control system. The valve 185*b* is closed for a period of time to allow pressure to build and then opens to discharge the built-up pressure before closing again to build pressure for the next pulse. The valve 185*b* can be electronically controlled and electrically operated, or it may be similar to a pressure relief valve that mechanically opens at a threshold pressure and closes again when the pressure drops. There may be other suitable techniques for generating pressure pulses at the second outlet 185 and in the pulse-pressure lines 173.

The effect of pressure pulses in the pulse pressure lines 173 is the injection of periodic air pockets into the stream of bulk material being conveyed into the conduit system 132 with dense slugs of bulk material between successive air pockets. Those air pockets between slugs of bulk material are compressed during conveyance, effectively keeping the entire length of conduit periodically pressurized rather than just being pressurized at the inlet.

The third outlet 187 is coupled with a dense phase boost line 189 (FIG. 20D). The boost line is optional but useful in dense phase conveying where a portion of the conveyance is vertical, since some of the conveying energy is lost to potential energy in the higher regions of the system. When employed, such boost lines 189 may be coupled with the conduit system 132 at one or more different heights to inject additional air pockets into the stream of bulk material and/or repressurize already existing air pockets. Various pneumatic components between the inlet 181 and third outlet 187 may include a 2-way magnetic or other remotely controllable valve 187*a*, a pressure regulator 187*a*, and/or other components. A controller or control system can remotely operate the valve 187*a* and/or synchronize its operation with the pressure pulses in the associated pulse-pressure line 173.

The pneumatic panel 175 may of course include other common pneumatic components such as pressure regulators, shut-off valves, flow restrictors, and/or sensors. Each branch 158A-D in which dense phase conveying is desired may have a dedicated pneumatic panel.

FIG. 20D is a schematic representation of a mobile bulk material container 166 coupled with the pneumatic receiving and conveying system 130 to convey bulk material into a bulk material silo or stationary storage container 112 via dense phase conveying. The mobile storage container 166 is coupled with the pneumatic inlet conduit 39 via a bulk material feed conduit 170 and coupling 168. The mobile storage container 166 is pressurized by the high-pressure line 171, to which it is coupled via coupling 177. The high-pressure line 171 is pressurized from the pneumatic panel 175. The pulse-pressure line 173, powered by the pneumatic panel 175, is coupled with the bulk material inlet conduit 39 downstream of the valve 174. And a boost pressure line 189 powered by the pneumatic panel is coupled with the conduit system 132 at multiple points along the conduit between the inlet conduit 39 and the storage container 112 into which the bulk material is being conveyed.

A bulk material handling method may include one or more of the following steps in various operable orders. In one aspect, the system 130 employs non-human verification that the bulk material from the mobile storage or transport container 166 is of the type intended to be stored in the stationary container 112 with which the mobile container is coupled. In one example, non-human verification includes receipt at the receiving terminal 172 of information pertinent to the type of material contained in the mobile container 166 before conveying begins. For instance, a 2D data matrix, QR code, bar code, or other encoded machine-readable image can be included on a bill of lading or other shipping document in the transport vehicle 164 operator's possession upon delivery. The terminal 172 may include a camera or other type of scanner configured to recognize the image on the shipping document and match the image with a material type from a data table in computer memory, for example. In other examples, the delivery vehicle 164 may be equipped with an RFID tag or other wireless communicator indicative of the type of bulk material contained in the mobile container, and the receiving terminal is an RFID reader or wireless receiver that does not require human-user interaction.

In one manner of operating the pneumatic receiving and conveyance system, the driver/operator of the transport vehicle 164 arrives at the installation 12 with the mobile container 166 filled with a particular type of bulk material. The driver/operator may be unaware of the type of bulk material being delivered. On arrival, the driver/operator presents a shipping document to a vision system of the receiving terminal 172, which reads a graphic image and thereby determines the type of material in the mobile container 166 and actuates the appropriate indicator 178 to inform the driver/operator which of the multiple couplings 168 along the outside of the installation 12 is the proper coupling to receive the type of material in the mobile container 166. In FIG. 20A, the indicators 178 are visual indicators and the leftmost indicator in the figure is shown illuminated. Auditory indicators can be used in addition to or instead of visual indicators. When the driver/operator couples the feed conduit 170 to the indicated coupling 168, the system detects the coupling (e.g., via microswitch, capacitive sensing, proximity switch, etc.) and may provide another indicator prompting the driver/operator to approach the receiving terminal, where they are instructed to again present the shipping document to the receiving terminal 172 to verify that the proper coupling 168 has been engaged by the feed conduit 170. The system 130 may for example employ a mechanical microswitch, a capacitive sensor, a proximity switch, or other type of sensor at each coupling to detect which coupling has been engaged with the feed conduit. If the proper coupling 168 has been engaged, the system 130 checks to determine whether the appropriate high-pressure line 171 has been coupled with the mobile storage container 166. If not, the driver/operator is provided another indicator to do so. Once the feed conduit 170 is coupled with the proper inlet conduit 39 and with the proper high-pressure line 171, the corresponding valve 174 is opened and the pneumatic conveying is permitted to begin.

The determinations made by the system 130 based on information received at the receiving terminal 172 can be made locally by a controller at the terminal or remotely by a different system controller, such as a controller 176 of the controls subsystem 46. Likewise, operation of the valves 174 may be under the control of a terminal controller or another system controller.

In another aspect, the system 130 is capable of selecting which silo 112 of the array 200 the incoming bulk material should be routed to and is further capable of operating the valves 162 of the conduit system 132 to direct the bulk material to the desired silo. In one embodiment, the controller 176 determines which one of multiple silos containing the same bulk material the incoming bulk material should be routed to based on information received from the fill-level sensors. For example, the controller 176 may have information from the various fill-level sensors 150 of the array 200 allowing it to determine which of the silos 112 containing bulk material A is at the lowest level and which of the same silos is at the highest level. The controller 176 may then control the valves 162 to initially route incoming bulk material to the silo containing the least amount of bulk material A. In other embodiments, the controller 176 may operate to initially top-off the silo 112 having the greatest amount of bulk material contained therein when conveying begins.

Figure 21:
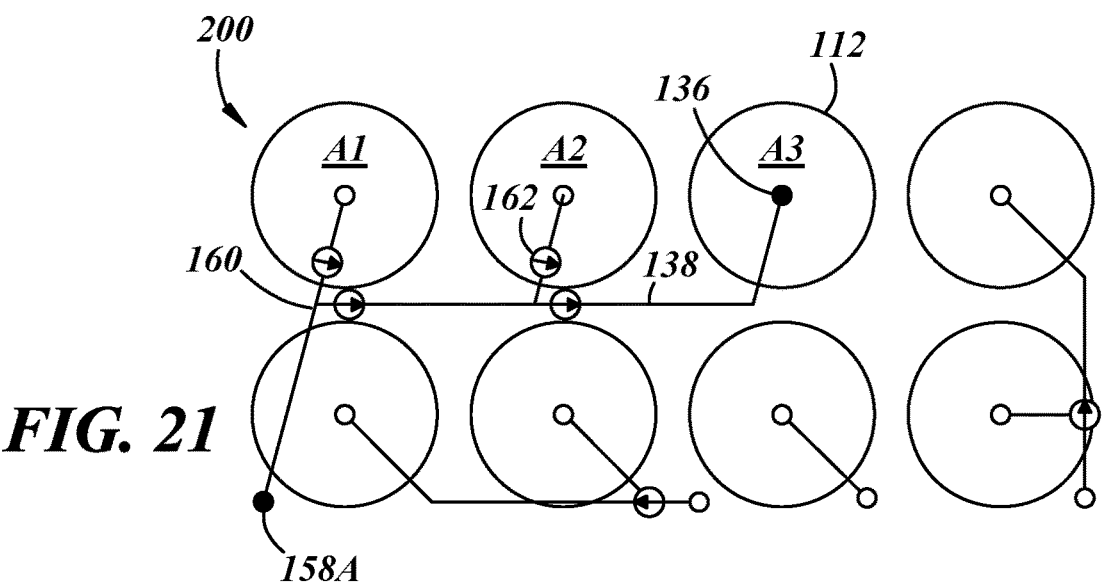
FIG. 21 is a schematic depiction of a conduit system with incoming bulk material routed to one of three storage containers of one branch of the conduit system.

In either case, the system 130 may also be configured to reroute incoming bulk material to a different silo containing the same type of bulk material during conveyance without interrupting the conveying. An example is illustrated schematically in FIGS. 21-23, where three of the silos 112 are intended to contain bulk material A and are labelled A1-A3. Here, a mobile bulk material container 166 has arrived for delivery of bulk material, and information has been received at the receiving terminal 172 that the type of bulk material is bulk material A. The controller 176 receives that information and, in response, determines which of silos A1-A3 has the least amount of material inside, based on information received from the fill-level sensors on each silo. In this case, silo A3 contains the least amount of bulk material, and the controller opens the valves 162 leading from branch feed pipe 158A to the downpipe 136 of silo A3 while closing the valves leading to the downpipes of silos A1 and A2 so that the incoming material is initially routed to silo A3, as indicated in FIG. 21.

Figure 22:
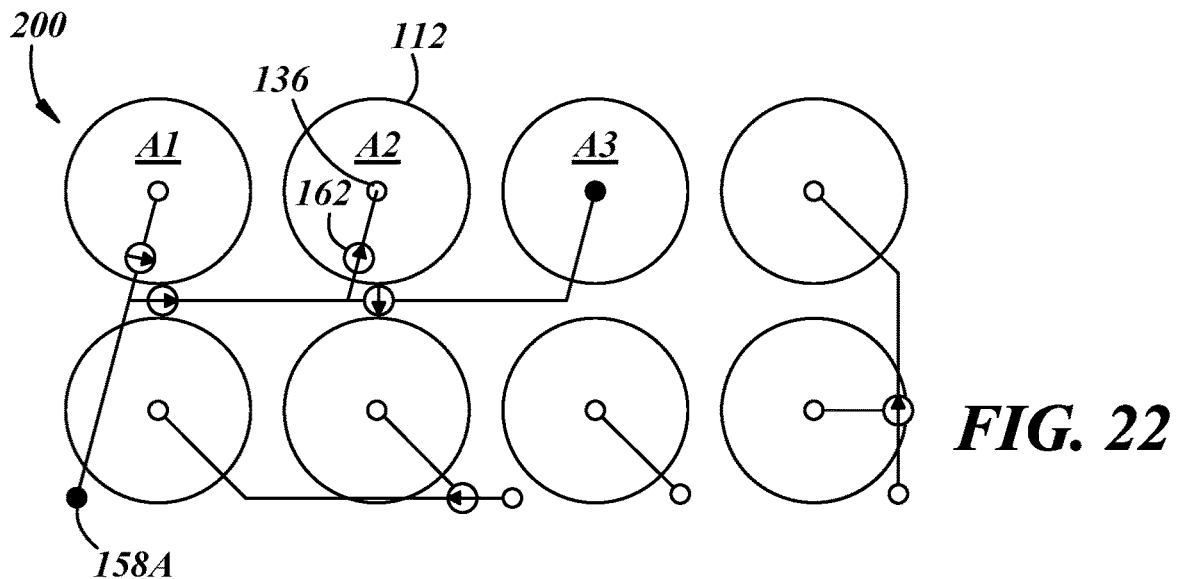
FIG. 22 is a schematic depiction of the conduit system of FIG. 21 with the incoming bulk material re-routed to a different one of the three storage containers.

Once the fill-level sensor of silo A3 indicates that a threshold level of bulk material is contained in silo A3, the controller reroutes the incoming material to one of the other two silos A1-A2 based on which of the silos presently contains the least amount of material. In the example of FIG. 22, the incoming material is rerouted to silo A2. This involves first opening the valve 162 leading to the downpipe 136 of silo A2, and then closing the valve leading to silo A3 while leaving the other two valves in the same position. This order of valve operation helps prevent unwanted pressure build-up un the conduit system 132.

Figure 23:
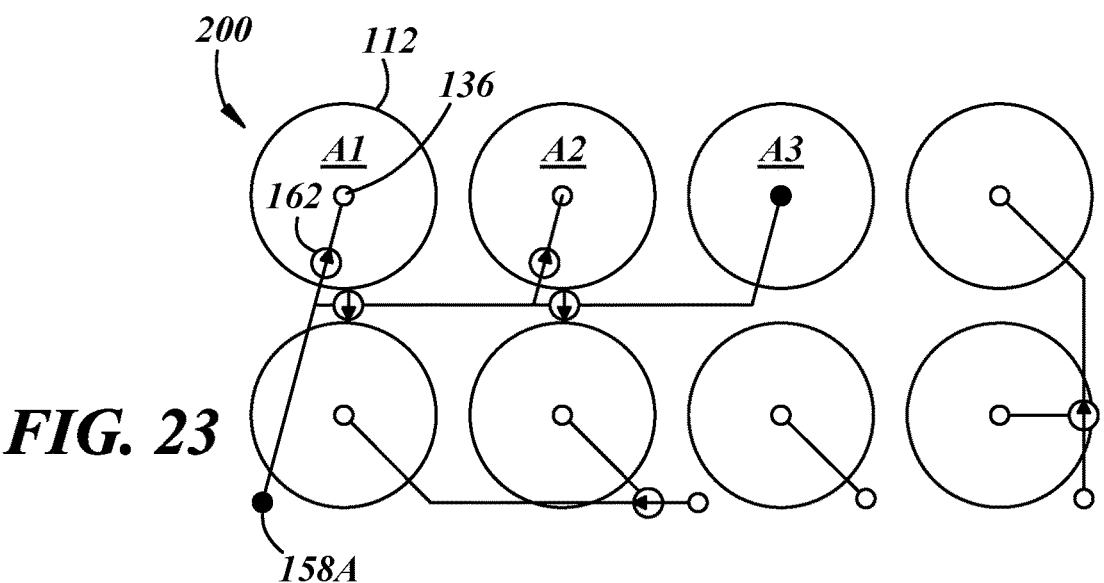
FIG. 23 is a schematic depiction of the conduit system of FIG. 21 with the incoming bulk material re-routed to a third one of the three storage containers.

Once the fill-level sensor of silo A2 indicates that a threshold level of bulk material is contained in silo A2, the controller reroutes the incoming material to silo A1 if there is still bulk material remaining to be conveyed from the mobile container 166 and if silo A1 is not already at the threshold level indicating it is full. In any case, conveying is halted if all silos containing the same type of material are full. In FIG. 23, the incoming material is rerouted from silo A2 to silo A1, which involves first opening the valve 162 leading to the downpipe 136 of silo A1, and then closing the valve leading to silos A3 and A3.

This order of silo filling is merely illustrative, and other valve control schemes can be used. For example, the fill-level of each of a plurality of silos containing the same bulk material type can be monitored during conveying from the mobile bulk material container and the valves of the system 132 can be controlled to more evenly distribute the incoming bulk material.

Figure 24:
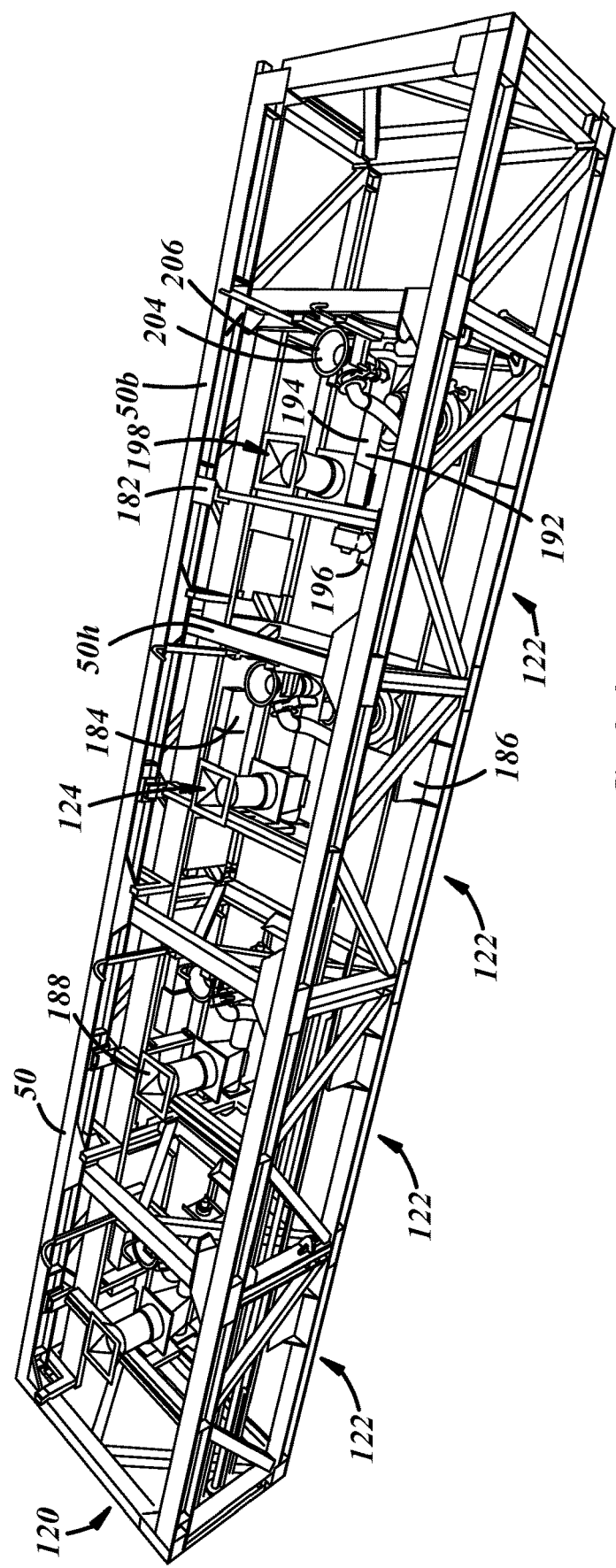
FIG. 24 is a top perspective view of a bulk material dispensing module of the system of FIG. 13.
Figure 25:
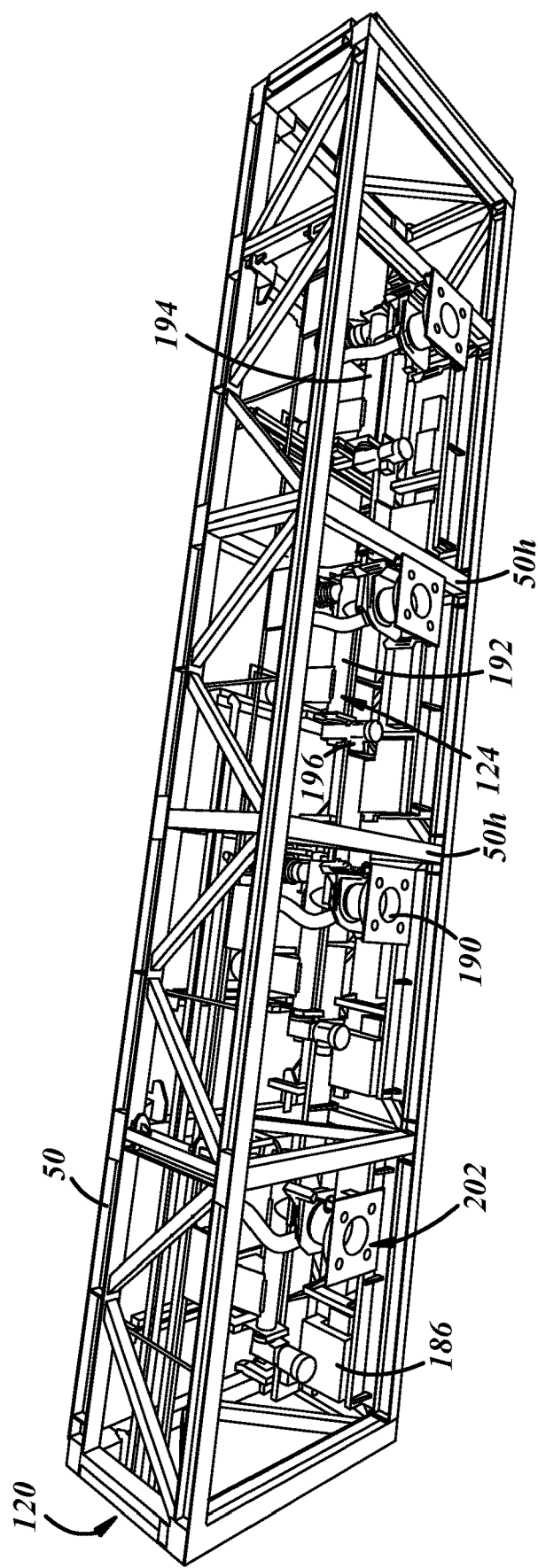
FIG. 25 is a bottom perspective view of the bulk material dispensing module of the system of FIG. 13.

With reference now to FIGS. 13-16 and FIGS. 24-34, various components of an illustrative bulk material dispensing module 120 are described in further detail. FIGS. 24 and 25 respectively illustrate top and bottom perspective views of a dispensing module 120 of the dispensing module array 300 of FIGS. 13-15 and of the storage and dispensing module 100' of FIG. 16. Each dispensing module 120 includes the dispensing module frame 50 of FIG. 10 and one or more bulk material dispensers 124. Dispensing cells 122 are defined between successive transverse cross-members 50h, which are spaced apart by the width of the silo modules 110 which they support. In this example, a bulk material dispenser 124 is supported by the frame 50 in each of the four dispensing cells 122. One end of each dispenser 124 is supported in its respective cell 122 by upper and lower intermediate cross-members 50g,h, and an opposite end of each dispenser is supported by an additional transverse member 182 having its ends affixed to the upper beams 50b of the frame 50. Each dispensing cell 122 also includes one or more microcontrollers 184 on one vertical side (e.g., the back side) of the frame 50 and a pressure valve 186 on the opposite vertical side (e.g., the front side) of the frame.

With continued reference to FIGS. 24 and 25, each material dispenser 124 includes an inlet 188 accessible through a first or top side of the frame 50 and configured to be coupled with and receive material from the bulk material container 112 of an overlying storage container module 110. An outlet 190 of each dispenser 124 is accessible through an opposite second or bottom side of the frame 50 and configured to be coupled with and discharge bulk material to a transport bin (not shown in FIGS. 24-25). Each bulk material dispenser 124 also includes a conveyor 192 configured to move bulk material from the inlet 188 to the outlet 190 when the inlet is coupled with the overlying bulk material container. The conveyor 192 in this case is a screw conveyor comprising a screw with one or more screw flights housed in a housing 194 and rotated within the housing by a motor 196 or other actuator under the control of the associated microcontroller(s) 184.

Each bulk material dispenser 124 includes a dosing assembly 198 that provides the dispenser inlet 188 and includes the conveyor 192, as well as a docking assembly 202 that provides the dispenser outlet 190. The docking assembly 202 is arranged beneath the dosing assembly 198 to receive bulk material therefrom. Each bulk material dispenser 124 also includes at least a portion of a filter assembly 204 configured to remove solids from air inside the dispenser during dispenser operation. Each dispensing module 120 may include only a portion of the filter assembly 204 as part of the stand-alone module 120 due to the height of certain components of the filter assembly causing it to extend above the frame 50 when fully assembled. The illustrated dispensing module 120 thus includes only a lower portion 206 of the filter assembly 204 when the module is built remotely to be shipped to the installation site.

With reference now to FIGS. 26-34, an illustrative bulk material dispenser 124 is described as fully assembled with the overlying bulk material storage container 112 and dockable with an underlying transport bin 208. The illustrated bulk material dispenser 124 includes the dosing assembly 198 as an upper portion, the docking assembly 202 as a lower portion, and the filter assembly 204 configured to filter solids from air displaced from the transport bin 208 (FIGS. 28-30) during dispenser operation. The dispenser inlet 188 is carried by an inlet portion 210 of the dosing assembly 198 and is coupled with the outlet of the associated bulk material container 112 to receive bulk material therefrom. The inlet portion 210 feeds the conveyor 192 and, in this example, includes a hopper 212 coupled with the conveyor 192 at a lower end of the hopper and a connector tube 214 coupling the hopper 212 with the outlet of the overlying storage container 112. The conveyor 192 moves bulk material received from the storage container 112 from the inlet portion 210 to the outlet 190.

The dispenser outlet 190 is carried by the docking assembly 202 and is coupled with the transport bin 208 during dispenser operation to discharge the bulk material into the transport bin. The dispenser outlet 190 is provided by a lower plate 216 of the docking assembly 202 in this example. The lower plate 216 and outlet 190 are moveable toward and away from the dosing assembly 198 to couple with and decouple from the transport bin 208. The docking assembly 202 has an inlet 218 coupled with an outlet 220 of the conveyor 192 and includes one or more actuators 222 that move the dispenser outlet 190 with respect to the docking assembly inlet 218. In this example, the actuators 222 are pneumatic actuators and, more particularly, are lost-motion actuators configured to limit an amount of force applied to the transport bin 208 during docking and dosing. The docking assembly 202 and its operation will be described further below.

With reference to FIGS. 26-28 and 30, the filter assembly 204 includes a filter inlet 224, a filter outlet 226, a turbine 228, a housing 230 with an internal filter element, an air pressure accumulator tank 232, and a solids outlet 234. The filter inlet 224 is in fluidic communication with the dispenser outlet 190 via a conduit 236 extending between a vacuum port 238 and the filter inlet. More particularly, the filter inlet 224 is in fluidic communication with an internal volume 240 of the docking assembly 202 so that, when coupled with the transport bin 208 with the turbine 228 operating, an internal pressure of the internal volume 240 of the docking assembly 202 is less than the surrounding atmospheric pressure. This low-pressure region 240 within the docking assembly 202 ensures that no dust or other solids in the air displaced from the transport bin 208 during bulk material dispensing escapes from the system.

Figure 26:
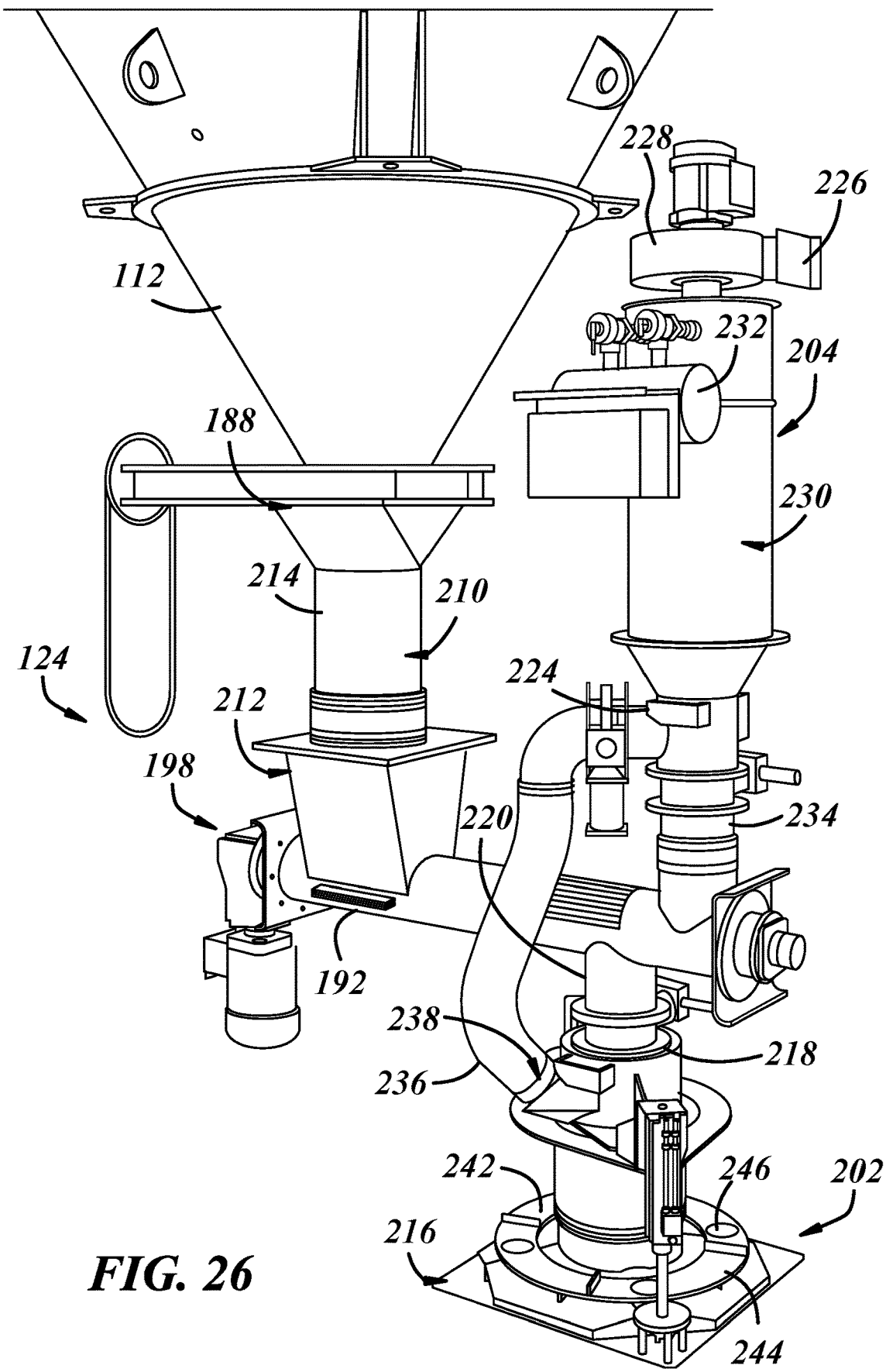
FIG. 26 is a perspective view of a bulk material dispenser of the module of FIGS. 24 and 25.
Figure 27:
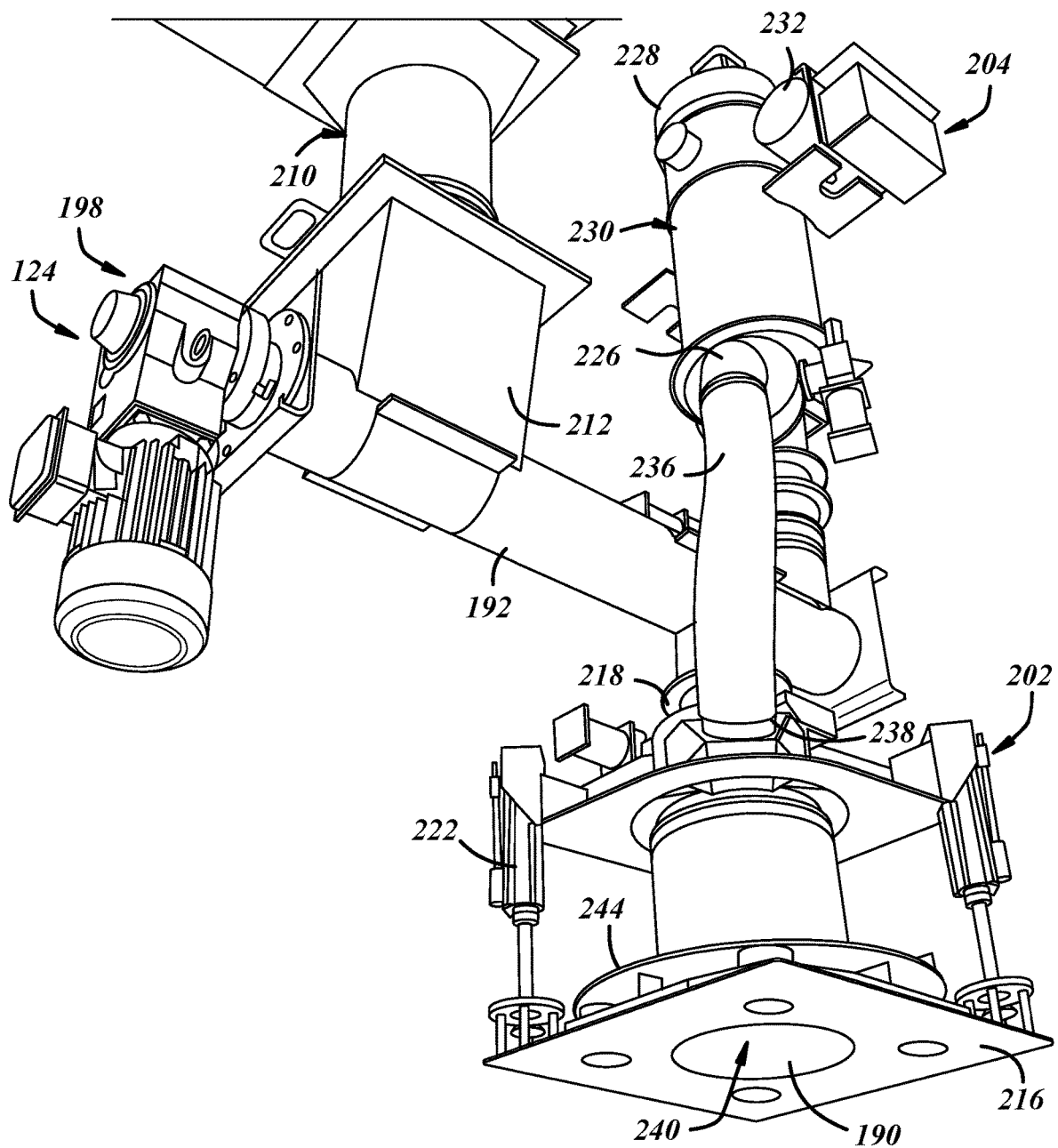
FIG. 27 is another perspective view of the bulk material dispenser of FIG. 26.
Figure 30:
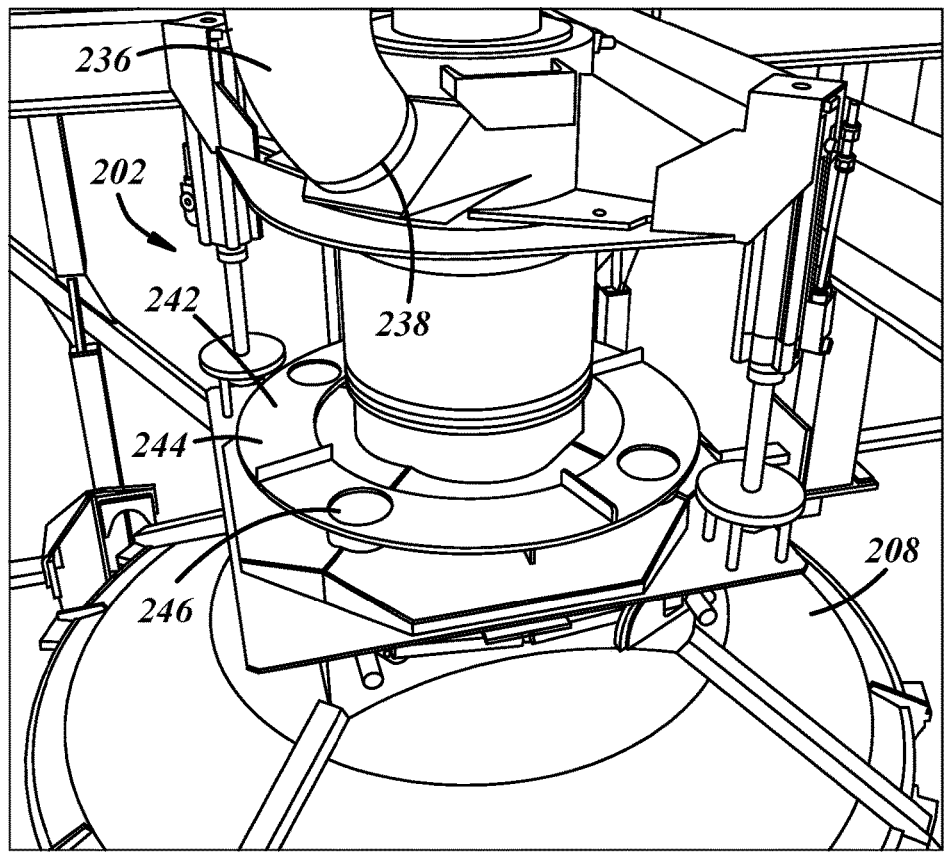
FIG. 30 is a perspective view of a docking assembly of the bulk material dispenser of FIG. 28 coupled with the transport bin.
Figure 32:
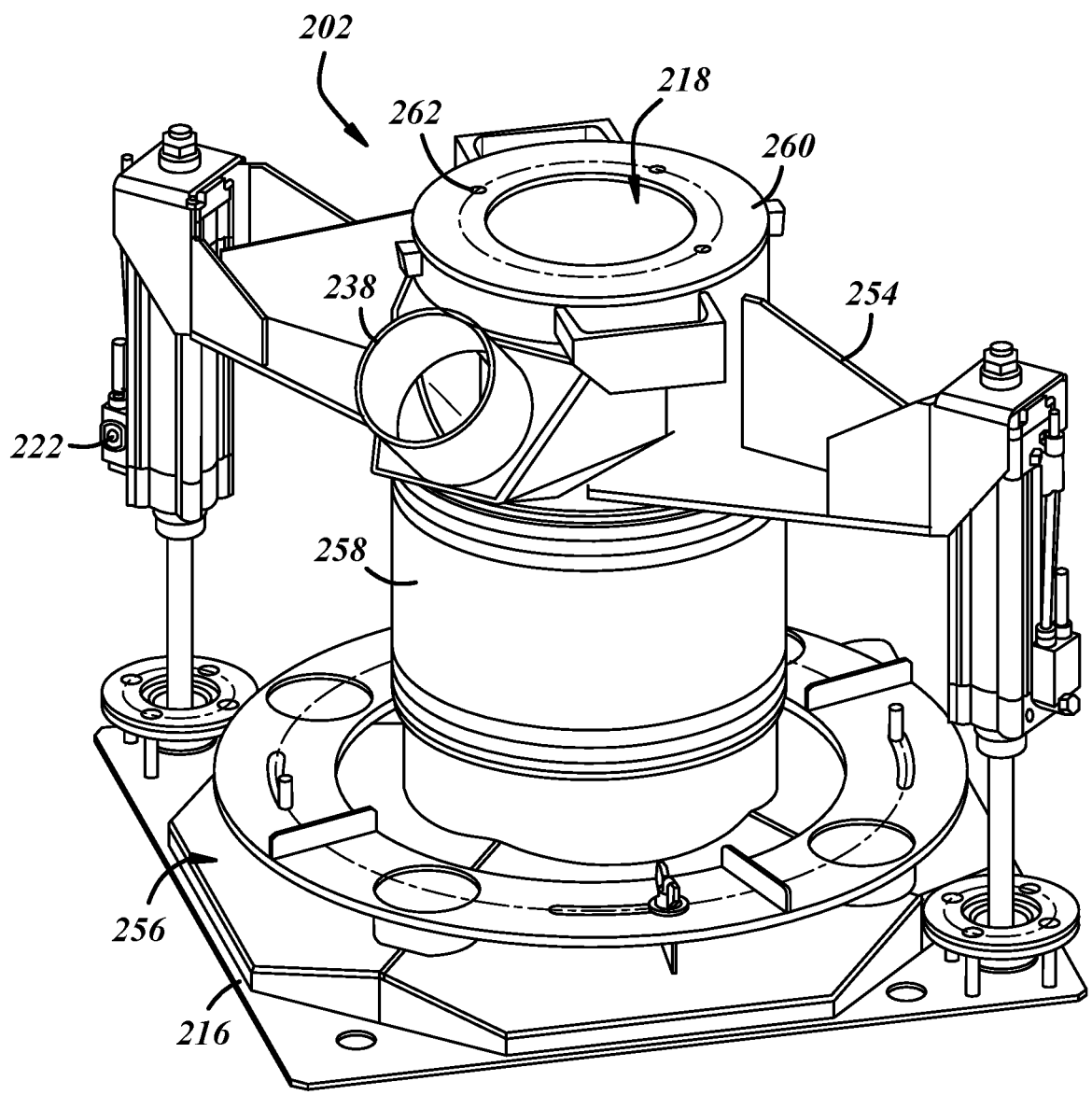
FIG. 32 is an isometric view of a docking assembly.

With reference to FIGS. 26, 30 and 32, an adjustable vent 242 is provided, as part of the docking assembly 202 in this case, to permit atmospheric air to enter the internal volume 240 of the docking assembly during turbine 228 operation and prevent the internal pressure from dropping too low and causing the turbine to be overworked. The illustrated vent 242 includes an annular adjuster 244 with apertures 246 formed therethrough. The adjuster 244 is located atop the lower plate 216, which has corresponding apertures formed therethrough. The adjuster 244 can be rotated about a vertical axis between a fully open position, in which the apertures 246 of the adjuster are aligned with the apertures of the lower plate 216, and a fully closed position, in which all apertures are closed-off. Adjustment of the vent 242 between these two extremes results in adjustment of the pressure differential between the internal volume 240 and the surrounding atmosphere. In particular, a more open vent 242 results in a higher internal pressure (and a lower pressure differential with the atmosphere), while a more closed vent results in a lower internal pressure (and a higher pressure differential with the atmosphere. This adjustment can be fine-tuned by starting with a fully open vent 242 and gradually closing it off until the pressure is sufficiently low in the internal volume 240 to prevent dust and other solids from escaping during dispensing.

The filter assembly housing 230 and its internal filter element are arranged between the filter inlet 224 and outlet 226. In this example, the outlet 224 is provided by the turbine assembly 228, which has an internal impeller operable to force air from the filter inlet 224, through the filter element, and out of the filter outlet 226. Dust and other solids filtered from the displaced transport bin air are routed to the conveyor 192 via gravity through the solids outlet 234 of the filter assembly 204. To accommodate this capture and rerouting of filtered particulates, the accumulator tank 232 is pulsed or discharged after dosing so that the solids fall to the conveyor 192. The accumulator tank 232 is charged via a system pressure source between pulse cycles. The filter pulse cycle is effected via the pressure valve 186 of the corresponding dispensing cell 122.

Figure 31:
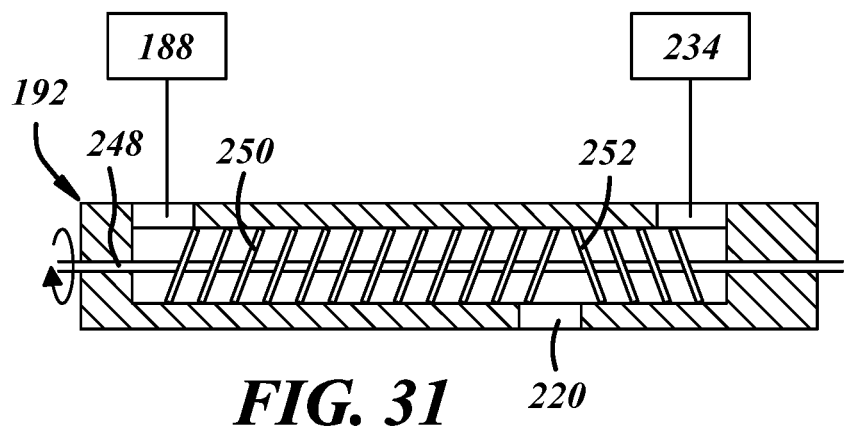
FIG. 31 is a schematic cross-sectional view of a screw conveyor of the bulk material dispenser of FIGS. 26-28.

With reference to the schematically depicted conveyor 192 of FIG. 31, where the conveyor 192 is a screw conveyor, an internal screw 248 may include a first screw flight 250 at one end of the screw that moves the bulk material in a first direction from the inlet 188 toward the conveyor outlet 220, and a second reverse screw flight 252 at an opposite end of the screw that moves the solids recovered from the filter assembly 204 from the solids outlet 234 in an opposite second direction toward the conveyor outlet 220 while the screw 248 is being turned in only one rotational direction about its axis.

With reference now to FIGS. 32-33 the docking assembly 202 is further described. The illustrated docking assembly 202 includes a receiving portion 254 that includes the docking assembly inlet 218, a docking portion 256 that includes the dispenser outlet 190, and one or more actuators 222 that moving the docking portion with respect to the receiving portion. The docking portion comprises the above-described lower plate 216, which provides the dispenser outlet 190 and mates with the transport bin 208. The actuators 222 may be lost-motion actuators as noted above to limit the amount of force applied to the transport bin 208 during docking and dosing. Here, the actuators 222 are pneumatic cylinders, but other actuators and actuator mechanisms are contemplated (e.g., solenoid, servo-powered gear train, etc.).

As best illustrated in the schematic depiction of FIGS. 34-35, the illustrated docking assembly 202 includes a collapsible sleeve 258 extending between the receiving portion 254 and docking portion 256. The collapsible sleeve 258 delimits the internal volume 240 of the docking assembly 202. The collapsible sleeve 258 can be a telescopic sleeve with nesting segments, a corrugated polymer sleeve, a fabric sleeve, or similar. The internal volume 240 of the docking assembly 202 thus changes with relative movement of the receiving portion 254 and docking portion 256.

The receiving portion 254 of the docking assembly 202 includes a coupling sleeve 260 having a first end 262 attached to the dosing assembly 198 and a second end 264 extending into the internal volume 240 of the docking assembly 202, as best illustrated in the cross-sectional view of FIG. 33. The first end 262 of the coupling sleeve 260 provides the docking assembly inlet 218. The coupling sleeve 260 further includes an inner sleeve 266 and an outer sleeve 268, both of which extend from the first end 262 and downward into the internal volume 240 of the docking assembly 202. The vacuum port 238 extends through the outer sleeve and fluidly connects the filter inlet to the internal volume 240 of the docking assembly 202 via an annular gap between the inner and outer sleeves 266, 268. The top end of the inner sleeve 266 is funnel-shaped and receives the bulk material from the conveyor 192. The bulk material thus travels through the center of the docking assembly 202 from the dosing assembly 198 to the transport bin 208. The inner sleeve 266 extends downward past the end of the outer sleeve and isolates the discharged bulk material from the outer sleeve 268 so that bulk material from the conveyor outlet 220 is not inadvertently drawn into the conduit 236 of the filter assembly.

In addition to the lower plate 216 and adjustable vent 242, the docking portion 256 of the docking assembly 202 also includes an upwardly extending sleeve 270 to which the lower end of the collapsible sleeve 258 is affixed. All of the sleeves 258, 266, 268, 270 are concentric. When the docking portion 256 is retracted toward the receiving portion 254, the inner sleeve 266 and outer sleeve 268 of the coupling sleeve are nested within the sleeve 270 of the docking portion 256 and the collapsible sleeve 258 is collapsed. When the docking portion 256 is extended away from the receiving portion 254, the inner sleeve 266 and outer sleeve 268 of the coupling sleeve are withdrawn from the sleeve 270 of the docking portion 256 and surrounded by the extended collapsible sleeve 258.

The above-described dispensing equipment enables bulk material dispensing methods, including methods of docking a transport bin with the dispensing equipment and methods of metering doses of bulk material from the bulk material silos at least as follows.

Figure 28:
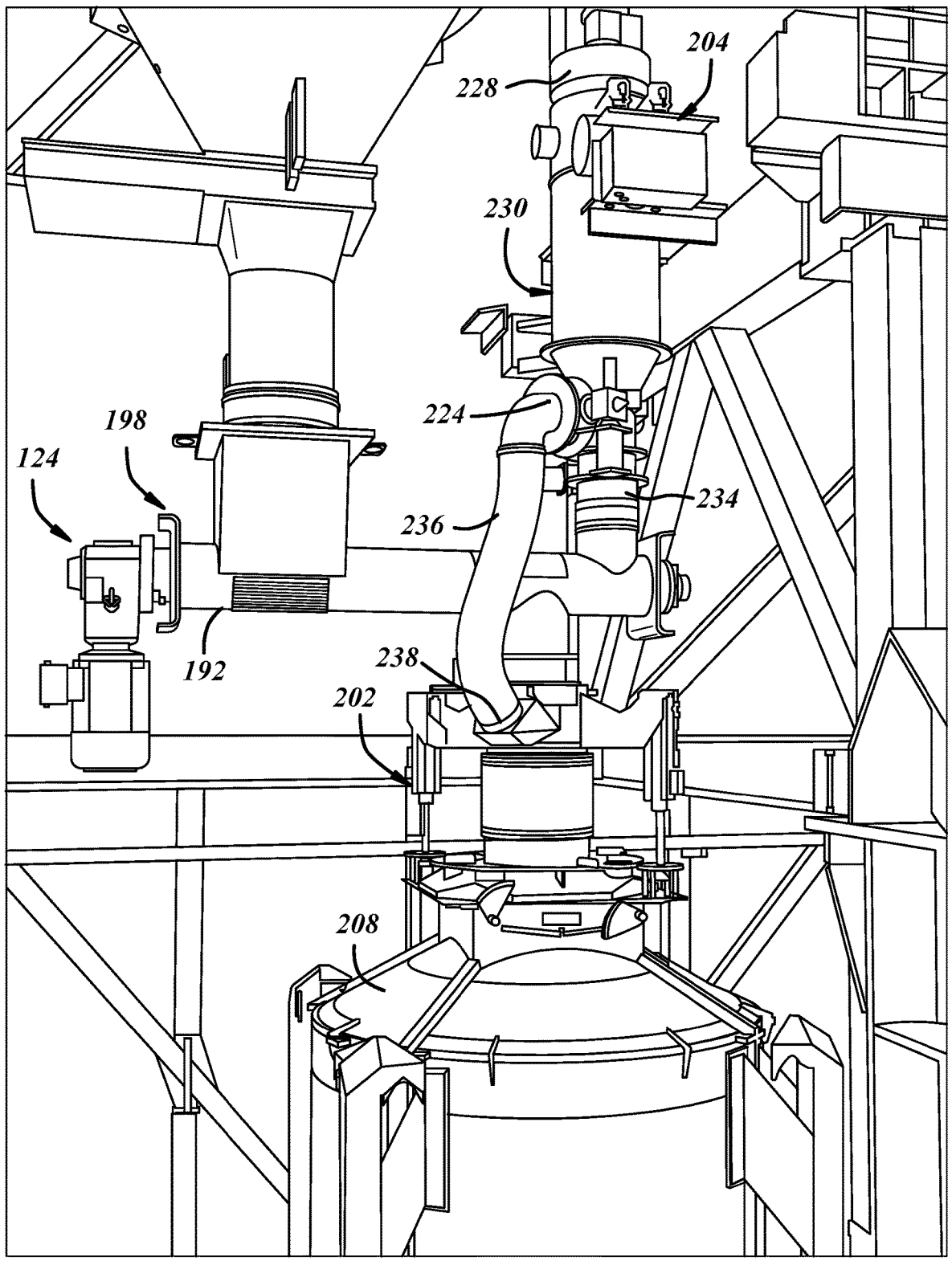
FIG. 28 is a perspective view of the bulk material dispenser of FIGS. 24-27 coupled with a transport bin.
Figure 29:
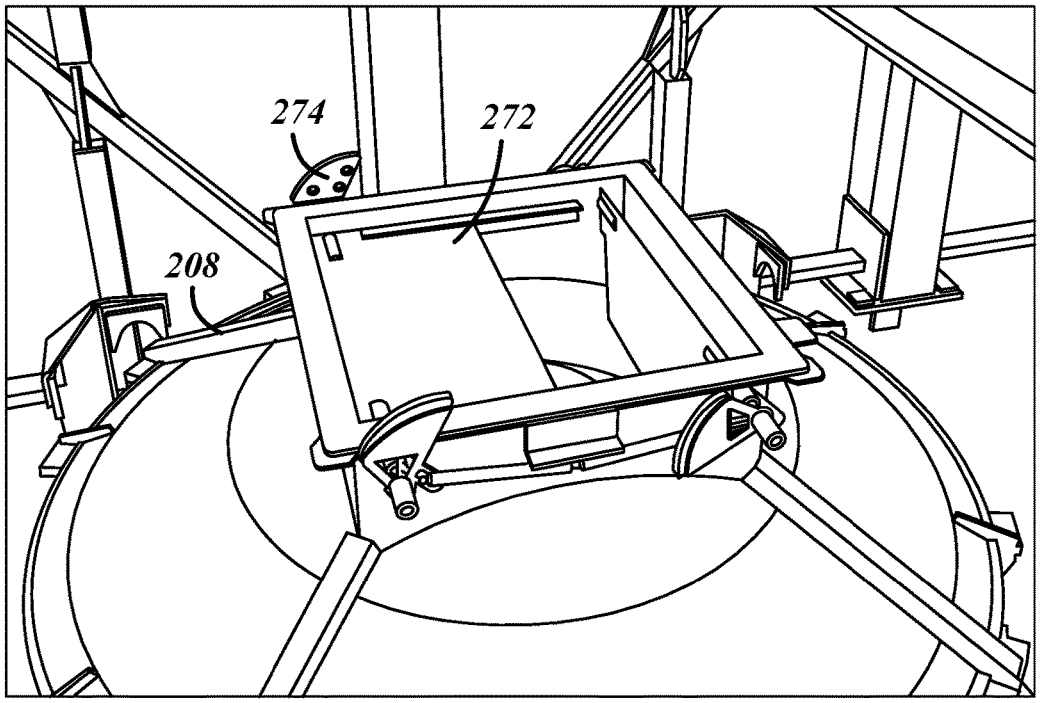
FIG. 29 is a top perspective view of the transport bin of FIG. 28 uncoupled from the bulk material dispenser.

An illustrative bulk material handling method may include a coupling or docking step, a receiving step, formation of a reduced pressure region, and a dispensing step. In the coupling or docking step, the outlet of the bulk material dispenser 124 is coupled with a transport bin 208 to form a closure at an inlet of the transport bin and place an inside of the transport bin in communication with the dispenser. The dispenser 124 and transport bin 208 are illustrated in the docked or coupled condition in FIGS. 28 and 30, and the inlet of an illustrative transport bin 208 is illustrated in FIG. 29 before docking. In this example, the coupling includes interfacial contact between the lower plate of the docking assembly and a lip surrounding the inlet of the transport bin. Other types of coupling are contemplated, such as positive engagement of protrusions and corresponding recesses, or positive engagement of a latch or other reversible attachment.

The receiving step in this case includes receiving bulk material in the dispenser 124 from the overlying bulk material container 112. Receiving of the bulk material in the dispenser occurs via gravity feed whenever the conveyer is actively moving bulk material toward the conveyor outlet. Formation of the reduced pressure region occurs in the internal volume 240 of the dispenser 124 when the turbine of the filter assembly is activated. Dispensing of the bulk material occurs via operation of the conveyor, which drops the bulk material from the conveyor outlet, through the reduced pressure region of the internal volume 240, and into the transport bin.

In one illustrative and more detailed example of the method, the transport bin 208 is placed beneath the docking assembly with the docking assembly in a retracted condition in which the actuators are in a retracted position and the collapsible sleeve is collapsed. With the docking assembly in this state, the dosing assembly and its conveyor are idle and not moving or actively receiving any bulk material, although the conveyor may be entirely full of bulk material from a previous dosing cycle. In addition, the filter assembly and its turbine are idle when the docking assembly is in the retracted condition.

With the inlet of the transport bin aligned beneath the docking portion of the docking assembly, the actuators of the docking assembly are extended and move the docking portion and the dispenser outlet toward the transport bin as the collapsible sleeve extends. When the docking portion contacts the transport bin and a minimal force is applied, the downward motion of the docking portion is halted by virtue of the lost-motion actuators, and the docked or coupled condition of FIGS. 28 and 30 is achieved.

After the docking assembly and transport bin are coupled together, the turbine of the filter assembly is activated. This reduces the pressure within the internal volume of the docking assembly and, thereby, within the transport bin. With this internal pressure sufficiently reduced, the conveyor of the dosing assembly is activated and begins moving the bulk material received from the overlying silo toward the conveyor outlet, where it is dropped through the concentric sleeves of the docking assembly and into the transport bin. The bulk material discharged from the conveyor is continuously replenished via gravity feed from the overlying silo.

When the desired dose of bulk material is dispensed into the transport bin, the conveyor is deactivated, thereby halting bulk material dispensing. The filter assembly may continue to operate for several seconds after dispensing is halted to remove as much solid material from the air inside the transport bin as possible. The filter assembly is then deactivated, and the filter element may be pulsed to dislodge the filtrate from the filter element to be dropped into the conveyor for dispensing during the next dosing cycle. Next, the actuators of the docking assembly are retracted, and the docking portion of the docking assembly is moved back toward the receiving portion to the retracted position. The transport bin can then be transported to another part of the majors or minors section of the installation.

In various embodiments, the dispensing step includes at least two sequential stages, a later one of the stages being slower than an earlier one of the stages. For example, the conveyor may operate with at least two rotational speeds, including a high speed and a low speed. When the conveyor is initially activated after docking, it may operate at the high speed and then change to the low speed at some threshold amount of the full dose of bulk material. In one particular example, the screw of a screw conveyor rotates at a high rotational speed until 85-95% of the desired dose of bulk material is dispensed, after which the rotational speed of the screw is slowed to a slow speed. The associated "coarse" and "fine" dispensing combines the speed of the high speed dispensing with the accuracy of low speed dispensing, which is most important as the amount of material dispensed into the transport bin approaches the total desired amount.

In various embodiments, the filter assembly may also operate with at least two sequential stages, a later one of the stages being more powerful than an earlier one of the stages. For example, the turbine of the filter assembly may operate with at least two rotational speeds, including a high speed and a low speed. When the turbine is initially activated after docking, it may operate at the low speed to achieved just enough of a reduced pressure region within the docking assembly as is necessary to prevent dust from escaping the coupled system. Then, the turbine may change to the high speed after dosing is completed and the conveyor is deactivated. The high-speed operation draws a much higher volume of atmospheric air through the vent of the docking assembly and causes turbulent flow within the space over the dispensed material in the transport bin to help draw as much of the solids-laden air from the transport bin as possible before halting the vacuum filtration and undocking from the transport bin.

The docking assembly may also cooperate with the transport bin to further reduce the amount of dust and other solids that escape the system during docking and undocking. In one non-limiting example, and with reference to FIG. 29, the transport bin 208 may be equipped with a closure 272 that is changeable between a closed condition and an open condition. In the example of FIG. 29, the closure 272 includes a pair of doors, one of which is in the closed condition (i.e., the left door in the figure) and one of which is in the open condition (i.e., the right door in the figure). Levers 274 are affixed to hinges of the doors and extend above the inlet of the bin when the docking assembly is in the retracted condition. The doors of the closure 272 are biased toward the closed condition so that they are closed when the transport bin is undocked. As best shown in the schematic views of FIGS. 34 and 35, when the docking assembly is changed from the retracted condition of FIG. 34 to the extended condition of FIG. 35, the lower plate of the docking assembly contacts the levers 274, which rotates the doors of the closure to their open condition as the transport bin is docked. Likewise, after bulk material dispensing is completed and the docking assembly is changed back to the retracted condition of FIG. 34, the doors of the closure are moved back to the closed condition by virtue of their bias toward that condition.

As used in herein, the terminology "for example," "e.g.," "for instance," "like," "such as," "comprising," "having," "including," and the like, when used with a listing of one or more elements, is to be construed as open-ended, meaning that the listing does not exclude additional elements. Also, as used herein, the term "may" is an expedient merely to indicate optionality, for instance, of a disclosed embodiment, element, feature, or the like, and should not be construed as rendering indefinite any disclosure herein. Moreover, directional words such as front, rear, top, bottom, upper, lower, radial, circumferential, axial, lateral, longitudinal, vertical, horizontal, transverse, and/or the like are employed by way of example and not necessarily limitation.

Finally, the subject matter of this application is presently disclosed in conjunction with several explicit illustrative embodiments and modifications to those embodiments, using various terms. All terms used herein are intended to be merely descriptive, rather than necessarily limiting, and are to be interpreted and construed in accordance with their ordinary and customary meaning in the art, unless used in a context that requires a different interpretation. And for the sake of expediency, each explicit illustrative embodiment and modification is hereby incorporated by reference into one or more of the other explicit illustrative embodiments and modifications. As such, many other embodiments, modifications, and equivalents thereto, either exist now or are yet to be discovered and, thus, it is neither intended nor possible to presently describe all such subject matter, which will readily be suggested to persons of ordinary skill in the art in view of the present disclosure. Rather, the present disclosure is intended to embrace all such embodiments and modifications of the subject matter of this application, and equivalents thereto, as fall within the broad scope of the accompanying claims.

The invention claimed is:

1. A bulk material dispenser, comprising:
   a dispenser inlet configured for coupling with and receiving bulk material from an outlet of a bulk material storage container;
   a dispenser outlet configured for coupling with and discharging the bulk material into a transport bin;
   a conveyor that moves bulk material received at the dispenser inlet toward the dispenser outlet; and
   a filter assembly configured to filter solids from air displaced from the transport bin during dispenser operation,
   wherein the conveyor receives bulk material via the dispenser inlet at one end of the conveyor and receives the solids filtered from the air at an opposite end of the conveyor via a solids outlet of the filter assembly.

2. The dispenser of claim 1, further comprising:
   a dosing assembly comprising the dispenser inlet and the conveyor; and
   a docking assembly comprising the dispenser outlet, wherein the dispenser outlet is moveable toward and away from the dosing assembly to couple with and decouple from the transport bin.

3. The dispenser of claim 2, wherein the docking assembly comprises an inlet coupled with an outlet of the dosing assembly and an actuator that moves the dispenser outlet with respect to the docking assembly inlet.

4. The dispenser of claim 2, wherein an inlet of the filter assembly is coupled with an internal volume of the docking assembly so that an internal pressure of said internal volume is less than atmospheric pressure when the dispenser is coupled with the transport bin.

5. The dispenser of claim 4, further comprising an adjustable vent that permits air flow into said internal volume, wherein adjustment of the vent changes said internal pressure.

6. The dispenser of claim 1, wherein the filter assembly comprises:
   a filter inlet in fluidic communication with the dispenser outlet;
   a filter outlet;
   a filter element between the filter inlet and filter outlet;
   a turbine arranged to force air from the filter inlet, through the filter element, and toward the filter outlet; and
   the solids outlet coupled with the conveyor,
   wherein the solids filtered from the air in the filter assembly are routed to the conveyor for movement toward the dispenser outlet.

7. The dispenser of claim 1, wherein the conveyor is a screw conveyor comprising a screw having a first flight that moves bulk material in a first direction from the dispenser inlet toward the dispenser outlet and second flight that moves filtered solids in an opposite second direction from the solids outlet toward the dispenser outlet.

8. A bulk material dispensing module, comprising:
   a dispensing module frame having a longitudinal axis, the frame further comprising a plurality of transverse frame members spaced along the longitudinal axis, wherein a dispensing cell is defined between each pair of transverse frame members;

at least one bulk material dispenser according to claim 1 supported within the frame, each bulk material dispenser being supported in a different dispensing cell, wherein the dispenser inlet is accessible through a first side of the frame, and the dispenser outlet is accessible through an opposite side of the frame; and a controller carried by the frame for each bulk material dispenser, wherein the module is configured to be attached side-by-side with one or more other bulk material dispensing modules, each of the modules having identical frames, dispenser inlets, and dispenser outlets, and wherein the module has external dimensions less than or equal to an intermodal freight container.

9. A dispensing module array comprising a plurality of the dispensing modules of claim 6 arranged side-by-side with a top and a bottom of each frame lying in common respective planes.

10. A bulk material storage and dispensing system comprising a storage module array arranged atop the dispensing module array of claim 9, wherein each of a plurality of bulk material storage modules of the array is aligned with a different one of the dispensing cells, and each dispenser inlet is coupled with the outlet of a respective bulk material storage container.

11. A glass manufacturing facility comprising a ground level floor and no basement, a main frame on the floor, and the system of claim 10 supported from below by the main frame such that a habitable space is defined between the floor and the system.

12. The dispenser of claim 3, wherein the actuator is a lost-motion actuator that limits an amount force applied to the transport bin by the docking assembly.

13. The dispenser of claim 2, wherein the docking assembly further comprises a collapsible sleeve extending between a receiving portion and a docking portion of the docking assembly and defining an internal volume of the docking assembly that changes with movement of the receiving portion relative to the docking portion.

14. The dispenser of claim 13, the docking assembly further comprising a vacuum port in fluidic communication with the internal volume defined by the collapsible sleeve to reduce an internal pressure of the internal volume when the docking portion is in contact with the transport bin and a negative pressure is applied at the vacuum port.

15. The dispenser of claim 14, further comprising a vent that is operable to adjust the magnitude of the internal pressure for a given applied negative pressure.

16. The dispenser of claim 14, wherein the receiving portion further comprises a coupling sleeve comprising the vacuum port, a first end of the coupling sleeve being configured for attachment to the dosing assembly, and a second end of the coupling sleeve extending into said internal volume.

17. The dispenser of claim 16, wherein the coupling sleeve comprises an inner sleeve and an outer sleeve, the vacuum port being located on the outer sleeve and the inner sleeve being arranged to isolate the bulk material from the outer sleeve.

18. The dispenser of claim 1, wherein the filter assembly comprises a housing and internal filter element located above the conveyor such that the solids filtered from the air can be returned to the conveyor via the solids outlet of the filter assembly under the force of gravity.

19. The dispenser of claim 1, wherein the conveyor is a screw conveyor comprising a screw that moves bulk material received via the dispenser inlet in a first direction toward the dispenser outlet, and the same screw moves solids filtered from the air in an opposite second direction toward the dispenser outlet.

20. The dispenser of claim 1, further comprising an accumulator tank configured to be pulsed or discharged to cause the solids filtered from the air to fall into the conveyor.

21. The dispenser of claim 1, wherein the filter assembly is operable to force the air from a filter inlet, through a filter element, and out of a filter outlet to atmosphere.

22. The dispenser of claim 1, further comprising an adjustable vent that permits atmospheric air from outside the bulk material dispenser and outside the transport bin to be drawn into the filter assembly along with the air displaced from the transport bin.

23. The dispenser of claim 22, wherein the vent includes at least one aperture and an adjuster movable between a fully closed position, in which each aperture is closed-off, and an open position, in which at least a portion of each aperture is open to permit atmospheric air through the aperture.

24. The dispenser of claim 1, wherein the dispenser outlet is moveable along a straight line toward and away from the conveyor to couple with and decouple from the transport bin.

25. A bulk material dispenser, comprising:

a dosing assembly comprising a dispenser inlet configured for coupling with and receiving bulk material from an outlet of a bulk material storage container;

a docking assembly comprising a dispenser outlet configured for coupling with and discharging the bulk material into a transport bin, wherein the dispenser outlet is moveable toward and away from the dosing assembly to couple with and decouple from the transport bin;

the dosing assembly further comprising a conveyor that moves bulk material received at the dispenser inlet toward the dispenser outlet; and a filter assembly configured to filter solids from air displaced from the transport bin during dispenser operation, wherein the docking assembly comprises an inlet coupled with an outlet of the dosing assembly and an actuator that moves the dispenser outlet with respect to the docking assembly inlet.

26. The dispenser of claim 25, wherein the actuator is a lost-motion actuator that limits an amount force applied to the transport bin by the docking assembly.

27. The dispenser of claim 25, further comprising an adjustable vent that permits atmospheric air from outside the bulk material dispenser and outside the transport bin to be drawn into the filter assembly along with the air displaced from the transport bin.

28. The dispenser of claim 27, wherein the vent includes at least one aperture and an adjuster movable between a fully closed position, in which each aperture is closed-off, and an open position, in which at least a portion of each aperture is open to permit atmospheric air through the aperture.

29. A bulk material dispenser, comprising:

a dosing assembly comprising a dispenser inlet configured for coupling with and receiving bulk material from an outlet of a bulk material storage container;

a docking assembly comprising a dispenser outlet configured for coupling with and discharging the bulk material into a transport bin, wherein the dispenser outlet is moveable toward and away from the dosing assembly to couple with and decouple from the transport bin;

the dosing assembly further comprising a conveyor that moves bulk material received at the dispenser inlet toward the dispenser outlet; and a filter assembly configured to filter solids from air displaced from the transport bin during dispenser operation, wherein an inlet of the filter assembly is coupled with an internal volume of the docking assembly so that an internal pressure of said internal volume is less than atmospheric pressure when the dispenser is coupled with the transport bin, the bulk material dispenser further comprising an adjustable vent that permits air flow into said internal volume, wherein adjustment of the vent changes said internal pressure.

30. A bulk material dispenser, comprising:

a dispenser inlet configured for coupling with and receiving bulk material from an outlet of a bulk material storage container;

a dispenser outlet configured for coupling with and discharging the bulk material into a transport bin;

a screw conveyor comprising a screw having a first flight that moves bulk material received at the dispenser inlet in a first direction toward the dispenser outlet; and a filter assembly configured to filter solids from air displaced from the transport bin during dispenser operation, wherein the filter assembly comprises a solids outlet coupled with the conveyor, wherein the solids filtered from the air in the filter assembly are routed to the conveyor for movement toward the dispenser outlet, and wherein the screw comprises a second flight that moves filtered solids in a second direction, opposite from the first direction, from the solids outlet toward the dispenser outlet.

31. The dispenser of claim 30, wherein the filter assembly further comprises:

a filter inlet in fluidic communication with the dispenser outlet;

a filter outlet;

a filter element between the filter inlet and filter outlet; and a turbine arranged to force air from the filter inlet, through the filter element, and toward the filter outlet.

32. A bulk material dispenser, comprising:

a dosing assembly comprising a dispenser inlet configured for coupling with and receiving bulk material from an outlet of a bulk material storage container;

a docking assembly comprising a dispenser outlet configured for coupling with and discharging the bulk material into a transport bin, wherein the dispenser outlet is moveable toward and away from the dosing assembly to couple with and decouple from the transport bin;

the dosing assembly further comprising a conveyor that moves bulk material received at the dispenser inlet toward the dispenser outlet; and a filter assembly configured to filter solids from air displaced from the transport bin during dispenser operation, wherein the docking assembly further comprises a collapsible sleeve extending between a receiving portion and a docking portion of the docking assembly and defining an internal volume of the docking assembly that changes with movement of the receiving portion relative to the docking portion, the docking assembly further comprising a vacuum port in fluidic communication with the internal volume defined by the collapsible sleeve to reduce an internal pressure of the internal volume when the docking portion is in contact with the transport bin and a negative pressure is applied at the vacuum port.

33. The dispenser of claim 32, further comprising a vent that is operable to adjust the magnitude of the internal pressure for a given applied negative pressure.

34. The dispenser of claim 22, wherein the receiving portion further comprises a coupling sleeve comprising the vacuum port, a first end of the coupling sleeve being configured for attachment to the dosing assembly, and a second end of the coupling sleeve extending into said internal volume.

35. The dispenser of claim 34, wherein the coupling sleeve comprises an inner sleeve and an outer sleeve, the vacuum port being located on the outer sleeve and the inner sleeve being arranged to isolate the bulk material from the outer sleeve.

36. A bulk material handling method, comprising:

coupling an outlet of a bulk material dispenser with a transport bin to form a closure at an inlet of the transport bin and place an inside of the transport bin in communication with the dispenser;

receiving bulk material in the dispenser from a bulk material storage container;

forming a reduced pressure region in an internal volume of the dispenser;

dispensing the bulk material from the dispenser and into the transport bin through the reduced pressure region, wherein the reduced pressure region is provided by a filter assembly such that air displaced from the transport bin during the dispensing is received in the filter assembly; and filtering solids from the air received in the filter assembly.

37. The method of claim 36, wherein the dispensing step includes at least two sequential stages, a later one of the stages being slower than an earlier one of the stages.

38. The method of claim 36, wherein a conveyor moves the bulk material received from the bulk material storage container in a first direction and solids received from the filter assembly in an opposite second direction.

* * * * *